United States Patent [19]

Tsukagoshi

[11] Patent Number: 5,461,423
[45] Date of Patent: Oct. 24, 1995

[54] APPARATUS FOR GENERATING A MOTION VECTOR WITH HALF-PIXEL PRECISION FOR USE IN COMPRESSING A DIGITAL MOTION PICTURE SIGNAL

[75] Inventor: Ikuo Tsukagoshi, Tokyo, Japan

[73] Assignee: Sony Corporation, Japan

[21] Appl. No.: 148,821

[22] Filed: Nov. 4, 1993

Related U.S. Application Data

[63] Continuation-in-part of Ser. No. 66,723, May 24, 1993, Pat. No. 5,408,269.

[30] Foreign Application Priority Data

May 29, 1992 [JP] Japan .................................. 4-163833

[51] Int. Cl.$^6$ .............................. H04N 7/46; H04N 7/26
[52] U.S. Cl. ........................ 348/416; 348/402; 348/405; 348/407; 348/409; 348/412; 348/699; 348/700
[58] Field of Search .................................. 348/699, 416, 348/409, 412, 405, 407

[56] References Cited

U.S. PATENT DOCUMENTS

| | | | |
|---|---|---|---|
| 4,862,267 | 7/1989 | Chiang | 348/409 |
| 4,862,267 | 8/1989 | Gillard | 348/409 |
| 4,897,720 | 1/1990 | Wu et al. | 348/416 |
| 4,937,666 | 6/1990 | Yang | 358/136 |
| 4,982,285 | 1/1991 | Sugiyama | 348/416 |
| 4,985,768 | 1/1991 | Sugiyama | 348/416 |
| 5,030,953 | 7/1991 | Chiang | 341/172 |
| 5,083,202 | 1/1992 | Parke | 348/699 |
| 5,142,360 | 8/1992 | Niihara | 348/699 |
| 5,173,771 | 12/1992 | Kitazato | 348/699 |
| 5,173,772 | 12/1992 | Choi | 348/699 |
| 5,226,093 | 7/1993 | Iwase | 348/699 |

FOREIGN PATENT DOCUMENTS

| | | | |
|---|---|---|---|
| 0544122A1 | 1/1991 | European Pat. Off. | H04N 5/232 |
| 0447068A2 | 2/1991 | European Pat. Off. | H04N 7/13 |
| 0497586A2 | 1/1992 | European Pat. Off. | G06F 15/70 |
| 0517095A1 | 5/1992 | European Pat. Off. | H04N 5/14 |
| 57-127982 | 1/1981 | Japan | G11C 8/00 |
| 2090245 | 9/1988 | Japan | G06F 12/00 |
| 2236449 | 8/1989 | United Kingdom | H04N 5/14 |

OTHER PUBLICATIONS

"Very High Efficiency VLSI Chip–Pair for Full Search Block Matching With Fractional Precision," Kun–Min Yang et al., pp. 2437–2440, CH2673–2/0.80/0000–2437–1989 IEEE.

Primary Examiner—Tommy P. Chin
Assistant Examiner—Anand Rao
Attorney, Agent, or Firm—Limbach & Limbach; Ian Hardcastle

[57] ABSTRACT

Apparatus for generating a motion vector for use in compressing a digital motion picture signal. The apparatus comprises a circuit for obtaining a primary motion vector with one pixel precision between a picture block of the current picture and a designated block of the reference picture. The apparatus also includes a parallelizing circuit for convening the pixel data of the reference picture into parallel pixel data. The apparatus also includes a search area selecting circuit for selecting the parallel pixel data of a search area of the reference picture in response to the primary motion vector. The search area surrounds and includes the designated block. An interpolating circuit generates parallel half-pixel data from the parallel pixel data of the search area by interpolation in plural parallel paths. The interpolating circuit also selects sets of parallel half-pixel data from the parallel half-pixel data generated in the plural parallel paths, and serializes the sets of parallel half-pixel data to provide parallel matching blocks of half-pixel data. The matching blocks have shifts relative to the designated block of −½, 0, and +½ pixel, horizontally and vertically. The apparatus further includes a circuit for identifying the one of the matching blocks that most closely matches the picture block as a reference block. Finally, a motion vector calculating circuit calculates the motion vector with half-pixel precision from the primary motion vector and the shift of the reference block.

36 Claims, 11 Drawing Sheets

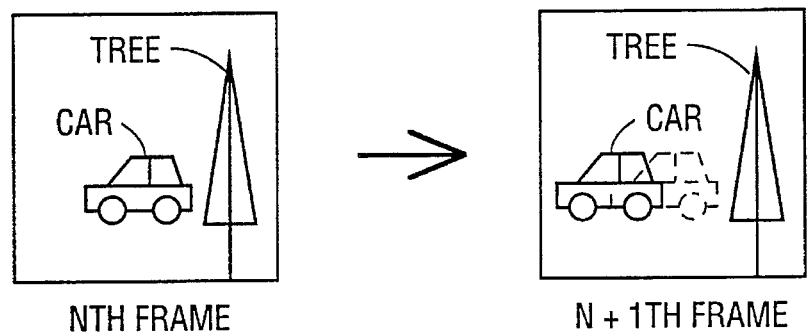
FIG. 1A
(PRIOR ART)
FIG. 1B
(PRIOR ART)
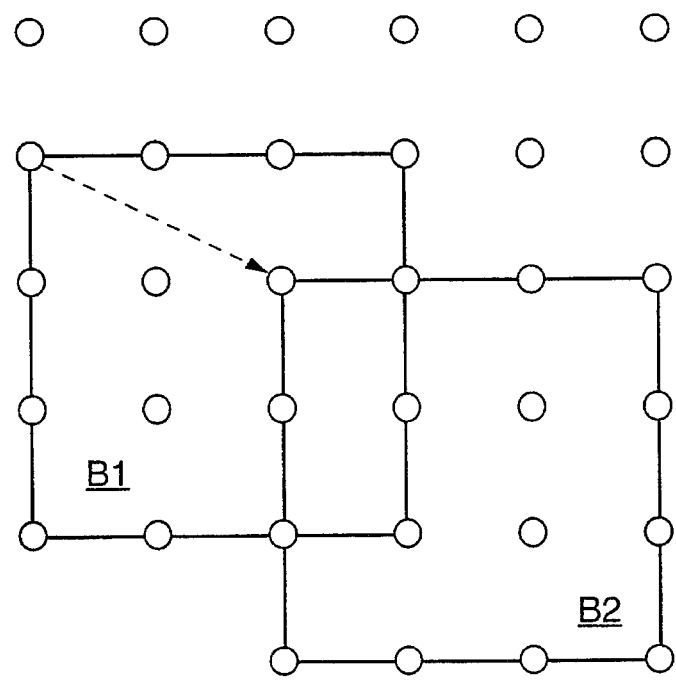
FIG. 1C
(PRIOR ART)

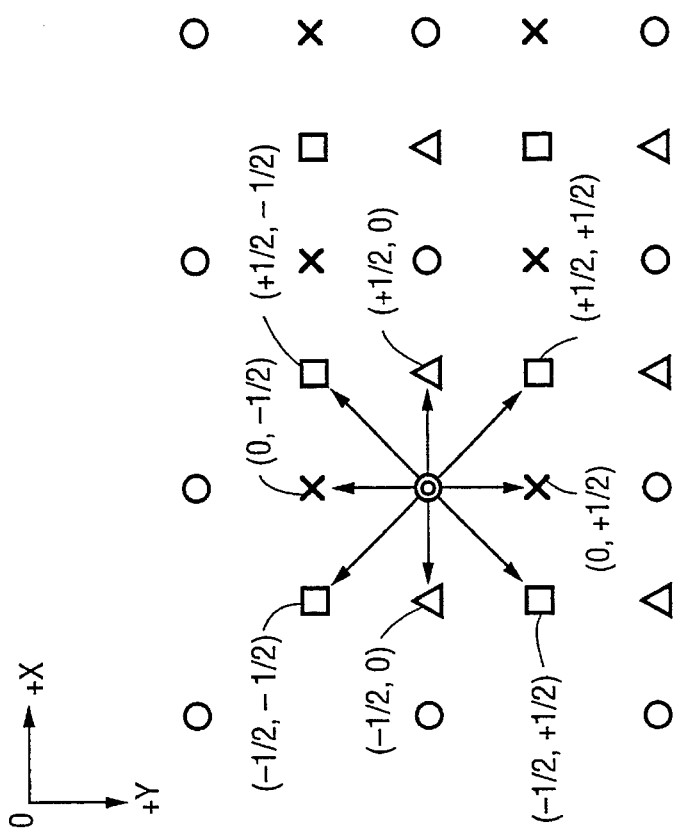
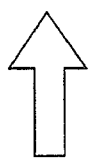
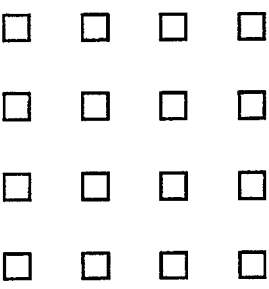
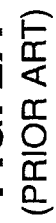
FIG. 2B (PRIOR ART)
FIG. 2C (PRIOR ART)
FIG. 2D (PRIOR ART)
FIG. 2A (PRIOR ART)

FIG. 11

APPARATUS FOR GENERATING A MOTION VECTOR WITH HALF-PIXEL PRECISION FOR USE IN COMPRESSING A DIGITAL MOTION PICTURE SIGNAL

PRIOR APPLICATION

This application is a Continuation-in-Part of applicant's pending prior application Ser. No. 08/066,723, filed May 24, 1993, now issued as U.S. Pat. No. 5,408,269 which claims the priority of Japanese patent application no. P04-163833, filed May 29, 1992.

FIELD OF THE INVENTION

This invention relates to an apparatus for compressing a digital motion picture signal in which the efficiency of the compression is increased to reduce the quantity of data to be transmitted.

BACKGROUND OF THE INVENTION

Conventional techniques for compressing a digital motion picture signal obtain a motion vector before quantizing the digital motion picture signal and quantize the motion picture signal in response to the motion vector. Compressors that compress a digital motion picture signal in response to a motion vector are disclosed in such patents as U.S. Pat. Nos. 4,982,285 and 4,985,768.

Generally, a motion picture signal has a high correlation between portions of the motion picture signal representing two consecutive frames, except when scene changes occur. Thus a motion picture signal can be compressed by determining the differences in the pixel data between consecutive frames of the motion picture signal, and then quantizing these differences. However, if the picture includes moving portions, the quantity of difference data can be large. For this reason, a method called block matching is preferably used.

FIGS. 1A to 1C are diagrams explaining the principles of block matching. The nth frame (FIG. 1A) and the n+1th frame (FIG. 1B) are compared. In these frames, the image portion labelled "tree" is almost unchanged between the frames. Therefore, the error resulting from placing the image portion "tree" in the n+1th frame (FIG. 1B) with the image portion "tree" of the nth frame (FIG. 1A) is rarely perceptible.

On the other hand, the image portion "car" in the n+1th frame cannot similarly be replaced by the image portion "car" in the nth frame. The image portion "car" in the n+1th frame (FIG. 1B) has moved significantly relative to the image portion "car" in the nth frame (FIG. 1A). This change of position of the image portion "car" is shown with solid lines and dotted lines in the n+1th frame of FIG. 1B.

There is almost no change in the image portion "car" itself between the nth frame (FIG. 1A) and the n+1th frame (FIG. 1B), so the image portion "car" can therefore be considered to be same in both frames. The block containing the image portion "car" in the nth frame (FIG. 1A) has moved horizontally to the position of the block containing the image portion "car" in the n+1th frame (FIG. 1B). Thus, the quantity of data required represent the motion picture can then be reduced by analyzing the picture into blocks, and expressing the amount and direction of movement of each block between consecutive frames as a motion vector.

The process of selecting a block of a previous frame that is in optimum accordance with each block of the current frame is called block matching. Block matching does not generate a motion vector immediately. Instead, as shown in FIG. 1C, in a predetermined area of the frame, a block of the previous frame (B1) is sequentially shifted up, down, left, and right by one pixel after being moved in accordance with the motion vector of the previous frame. After each shift, the difference between each pixel in the block of the current frame and the corresponding pixel of the shifted block of the previous frame is determined. Then, the block position (B2) where the sum of the differences is a minimum is selected, and the data quantity is reduced by using the resulting motion quantity (magnitude and direction) of the block B2 as the motion vector.

A known apparatus for compressing a digital motion picture signal moves each block of the previous frame in the x- and y-directions in response to the motion vector of the block in the previous frame in such a way that a motion vector that minimizes the sum of the absolute values of the differences (difference absolute value sum) between the current block and the corresponding block of the previous frame, shifted in each direction as just described, is determined to be the motion vector of the current block.

The quantity of difference data can be further reduced by calculating the motion vector with half-pixel precision. A typical method for determining the motion vector with half pixel precision will be described with reference to FIG. 2. First, a primary motion vector MVi is obtained for each block with one-pixel precision, as just described. Next, a secondary motion vector Vi with half-pixel precision is determined by calculating pixels with half-pixel precision, indicated by x, $\Delta$, and $\square$, by interpolation in the horizonal, vertical, and vertical directions, respectively. The secondary motion vector Vi is calculated using the pixel (indicated by ⊚) indicated by the motion vector MVi as origin, and is then combined with the primary motion vector MVi to obtain the desired motion vector MVH (=MVi+Vi) with half-pixel precision.

For example, in the case of a block consisting of 8 (in the horizontal (x) direction)×8 (in the vertical (y) direction) pixels, the motion vector with one-pixel precision is obtained for each block in 64 clock cycles. In this time, the corresponding block is displaced in accordance with a motion vector (i, j) and, using the displaced location as a starting point, the data for 10 (in the horizontal direction)×10 (in the vertical direction) pixels are read at one-pixel precision from (i-1, j-1 ) to (i+8, j+8), to carry out the interpolation processing.

When the motion vector MVH is determined with half-pixel precision, a double density search area is formed by deriving interpolation pixels (indicated by $\square$, $\Delta$, and x) between adjacent real pixels (indicated by O). Then, block matching is carried out between the search area and the current block to determine the motion vector MVH with half-pixel precision.

To determine the motion vector with a half-pixel precision, a method may be used in which interpolation is performed beforehand over the entire search area, and the resulting interpolation data are stored in a frame memory. In this case, to carry out the required interpolation, 10 (in the horizontal direction)×10 (in the vertical direction) pixel data must be read in a period of 64 clock cycles, so the interpolation operation must be carried out using a clock speed faster than the normal clock speed. Additionally, a clock signal with a clock speed of 64:100 must be generated using a Phase-Locked Loop (PLL) circuit. Since the clock speed ratio of the PLL is not a simple integer ratio, the system is non-synchronous, and a complex circuit construction must be used to provide synchronization.

As another method, the computed interpolation data are previously stored in frame memory, and a motion vector which minimizes the difference absolute value sum can then be determined with a half-pixel precision. However, since the number of interpolation pixels is larger than the number of pixels on which block matching is carried out, the speed of the block matching processing must be four times higher, or a block matching processing circuit having four times the scale must be used.

Therefore, neither of these two alternatives is practical in terms of system construction.

OBJECTS AND SUMMARY OF THE INVENTION

In view of the foregoing, an object of this invention is to provide an apparatus for compressing a digital motion picture signal that is capable of performing the required processing using a single clock signal, and that does not require an increased number of frame memories.

Accordingly, the invention provides an apparatus for generating a motion vector for use in compressing a digital motion picture signal. The apparatus comprises a circuit for obtaining a primary motion vector with one pixel precision between a picture block of the current picture and a designated block of the reference picture. The apparatus also includes a parallelizing circuit for converting the pixel data of the reference picture into parallel pixel data. The apparatus also includes a search area selecting circuit for selecting the parallel pixel data of a search area of the reference picture in response to the primary motion vector. The search area surrounds and includes the designated block. An interpolating circuit generates parallel half-pixel data from the parallel pixel data of the search area by interpolation in plural parallel paths. The interpolating circuit also selects sets of parallel half-pixel data from the parallel half-pixel data generated in the plural parallel paths, and serializes the sets of parallel half-pixel data to provide parallel matching blocks of half-pixel data. The matching blocks have shifts relative to the designated block of $-\frac{1}{2}$, 0, and $+\frac{1}{2}$ pixel, horizontally and vertically. The apparatus further includes a circuit for identifying the one of the matching blocks that most closely matches the picture block as a reference block. Finally, a motion vector calculating circuit calculates the motion vector with half-pixel precision from the primary motion vector and the shift of the reference block.

By calculating the motion vector MVH with half-pixel precision using half-pixel data generated by interpolation in the search area specified by the primary motion vector MVi with one-pixel precision, the number of frame memories can be reduced compared with the prior art.

Further, by generating the half-pixel data using parallel pixel data derived from the search area of the reference picture, the rate at which the interpolation processing is carried out can be increased, so that it is possible to calculated the motion vector MVH with half-pixel precision without increasing the clock frequency.

The nature, principle and utility of the invention will become more apparent from the following detailed description when read in conjunction with the accompanying drawings, in which like parts are designated by like reference numerals or characters.

BRIEF DESCRIPTION OF THE DRAWINGS

FIGS. 1A to 1C are schematic drawings illustrating block matching.

FIGS. 2A to 2D are drawings illustrating deriving half-pixels to calculate a motion vector with half-pixel precision.

FIG. 11 is a chart showing the relationship between the half pixels obtained by interpolation and the real pixels in the picture plane.

DETAILED DESCRIPTION OF THE INVENTION

A preferred embodiment of the apparatus and method according to the invention will be described with reference to the accompanying drawings.

(1) GENERAL CONSTRUCTION OF THE APPARATUS

Figure 3:
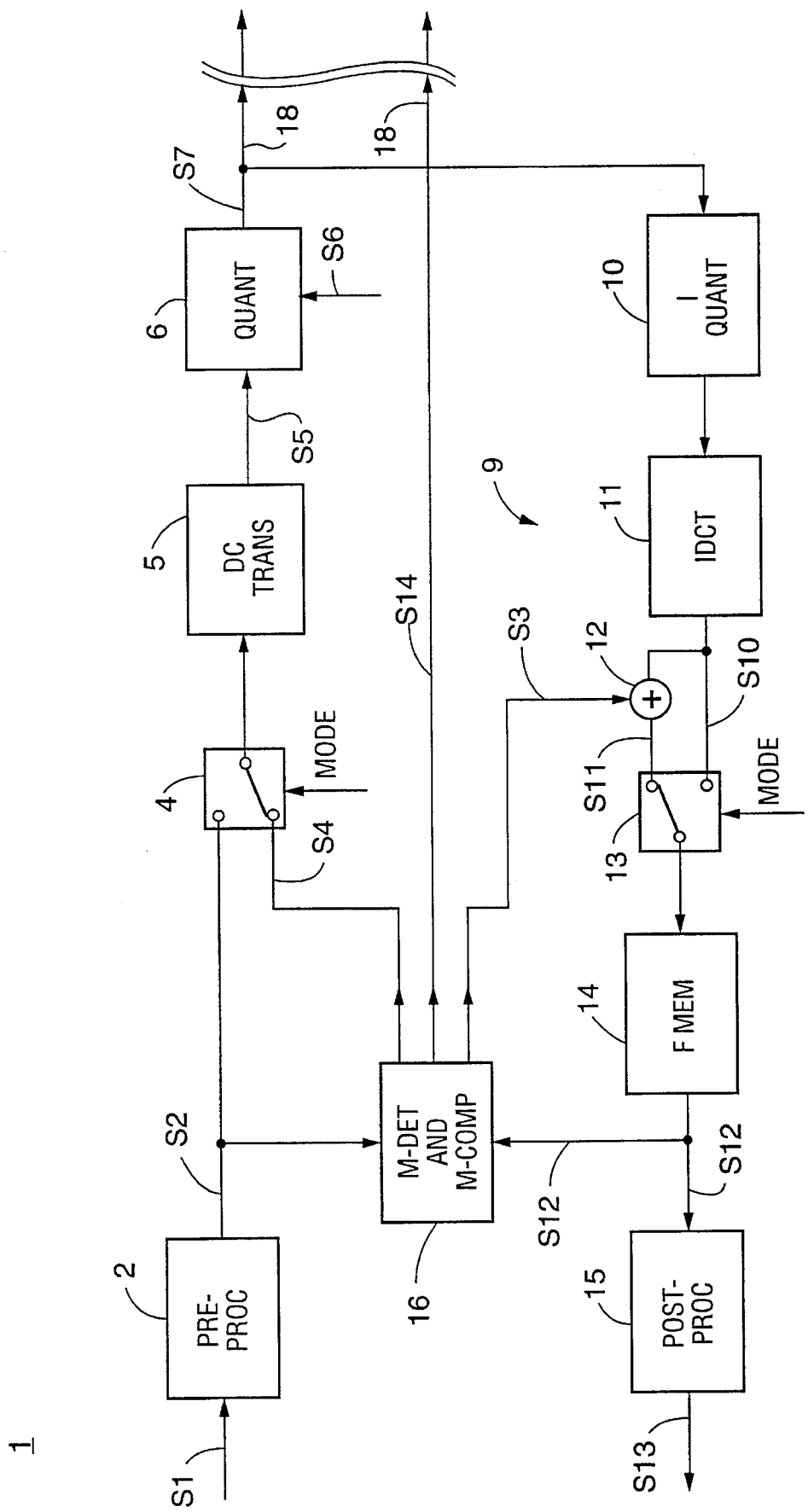
FIG. 3 is a block diagram showing the overall construction of an apparatus for compressing a digital motion picture signal according to the present invention.

Referring to FIG. 3, the reference numeral 1 generally indicates an apparatus according to the invention for compressing a digital motion picture signal. The pre-processing circuit 2 converts the analog motion picture signal S1 into a digital motion picture signal comprising plural pixel data. The pre-processing circuit 2 includes a matrix circuit and an analog/digital conversion circuit (not shown).

In the embodiment shown, the analog motion picture signal S1 is a color video signal. In the preprocessing circuit 2, the color video signal is separated into a luminance signal and a color difference signal. The apparatus and method according to the invention are applied to the luminance signal. The apparatus and method of the invention may additionally or alternatively be applicable to a color difference signal without departing from the spirit of the invention. Further, the pre-processing circuit 2 may be constructed to separate the color video signal into a luminance signal and a color difference signal, or to derive RGB components or other components from the color video signal. In this latter case, the apparatus and method of the invention may be applied to each RGB component.

In the pre-processing circuit 2, the digital video signal, which comprises plural pixel data, is divided into blocks of a certain number of pixel data to form picture blocks such as the picture block S2. Each picture block preferably consists of 8×8 pixel data, but may consist of 16×16 pixel data, or another number of pixel data.

In the following description, the digital video signal is described as being processed in units of a picture, which can mean a frame or a field.

The picture block S2 from the preprocessing circuit 2 is supplied to the motion detection and compensation circuit 16 and to the first switching circuit 4, the output of which is connected to the orthogonal transform circuit 5.

The motion detection and motion compensation circuit 16 receives the picture block S2 and the reference picture S12, and generates from them the reference block S3 and the difference block S4. The reference block S3 is a block of the reference picture S12 that most closely matches the picture block S2 and is obtained by applying motion compensation to the reference picture S12, as will be described below. The difference block S4 is a block of differences representing the inter-picture difference between the reference block S3, obtained by applying motion compensation to the reference picture S12, and the picture block S2 of the current picture. The difference block S4 is supplied to the first switching circuit 4.

When a picture is compressed by applying intra-picture compression, this will be referred to as a picture compressed using the intra-picture compression mode. When the picture is compressed by applying inter-picture compression, this will be referred to as a picture compressed using the inter-picture compression mode. The compression mode of each picture is chosen depending on which compression mode requires less data to compress the picture.

The first switching circuit 4 is controlled to switch according to the compression mode of the picture, and delivers either the picture block S2 or the difference block S4, whichever has the least difference absolute value sum relative to the average level of the block, to the orthogonal transform circuit 5.

The orthogonal transform circuit 5 orthogonally transforms each picture block S2, or each difference block S4, depending on the state of the first switching circuit 4. The resulting block of transform coefficients S5 is supplied to the quantizing circuit 6. The orthogonal transform circuit 5 performs a discrete cosine transform in this embodiment; however, other orthogonal transforms, for example, a fast Fourier transform (FFT) can also be used, as can a Wavelet transform or a Haar transform.

The quantizing circuit 6 quantizes the block of transform coefficients S5 using a quantizing step size set by the step-size control signal S6, and supplies the resulting block of quantized coefficients S7 via the digital output path 18 to processing circuits (not shown), which may include a variable-length coding circuit, etc.

The apparatus 1 for compressing a digital motion picture signal additionally includes the local expander 9, which locally expands each block of quantized coefficients S7 using the dequantizing circuit 10 and the inverse orthogonal transform circuit 11. The resulting locally-expanded picture block S10 is fed to the synthesizer 12, and to the second switching circuit 13.

The synthesizer 12 generates the synthesized picture block S11 by synthesizing the reference block S3 with the locally-expanded picture block S10. When the previous picture is compressed in the inter-picture compression mode, the second switching circuit 13 supplies the synthesized picture block S11 to the previous picture memory 14. On the other hand, when the previous picture is compressed in the intra-picture compression mode, the second switching circuit 13 supplies the locally-expanded picture block S10 directly to the previous picture memory 14.

The previous picture memory 14 replaces each block of picture data stored therein with the locally-expanded data block S10 or the synthesized picture block S11 from the second switching circuit S13 to regenerate the current picture. The regenerated current picture will be used as the reference picture for compressing the next picture. Prior to receiving the regenerated blocks of the current picture, the previous picture memory 14 supplies the regenerated blocks of the previous picture to the post processing circuit 15 and the motion detection and motion compensation circuit 16 as the reference picture S12 for use in compressing the current picture.

The post processing circuit 15 converts the blocks of the reference picture S12 into a raster signal, i.e., into a line sequence signal. The raster signal is converted into an analog signal by an internal digital-to-analog converter circuit (not shown), and is fed as the locally-decoded video signal S13 to an output terminal (not shown) for local display.

The motion detection and motion compensation circuit 16 compares the picture block S2 of the current picture with the reference picture S12 supplied from the previous picture memory 14 to generate the motion vector MVH with half-pixel precision. The motion vector MVH represents with a precision of one-half of a pixel the magnitude and direction of the motion of the picture block S2 of the current picture relative to the matching block of the reference picture S12 that most closely matches the picture block S2. The motion vector signal S14 representing the motion vector MVH is fed to the digital output path 18.

The data fed to the digital output path 18, including the motion vector signal S14 and the coded orthogonal transform coefficients S7, are processed by an error correcting circuit and a modulator, etc. (not shown) to produce a signal for transmission or for recording on a suitable recording medium, such as an optical disc.

The motion detection and motion compensation circuit 16 also generates the reference block S3, which is a block derived from the previous picture by interpolation equivalent to moving the picture block S2 by the amount and direction of movement defined by the motion vector MVH with half-pixel precision. The motion detection and motion compensation circuit 16 supplies the resulting reference block S3 to the synthesizer 12.

Finally, the motion detection and motion compensation circuit 16 generates the difference block S4, which is a block of differences between the picture block S2 and the reference block S3, i.e., is a block of differences between the picture block S2 and the block derived from the previous picture by interpolation equivalent to moving the picture block S2 by the amount and direction of movement defined by the motion vector MVH with half-pixel precision. The motion detection and motion compensation circuit 16 supplies the resulting difference block S4 to the first switching circuit 4.

(2) CONSTRUCTION OF THE MOTION DETECTION AND MOTION COMPENSATION CIRCUIT 16

The motion detection and motion compensation circuit 16 first calculates the primary motion vector MVi with one-pixel precision. Using the primary motion vector MVi, the motion detection and motion compensation circuit 16 defines a search area of 10 pixels×10 pixels in which interpolation pixels will be generated. The search area is an area of the reference picture that extends from 0 to 9 pixels in the x- and y- directions, in which the pixel indicated by the primary motion vector MVI with one pixel precision is located at 1,1.

The motion detection and motion compensation circuit 16 then generates eight 8×8 matching blocks each of 64 interpolation pixels by interpolation from the pixels of the search area of the reference picture S12. The each of the eight matching blocks is generated by interpolation to emulate shifting a designated block by −½, 0, and +½ pixel in each of the x- and y-directions. The designated block is the 8×8 pixel block that has the pixel indicated by the primary motion vector MVI at its top left-hand corner, and extends from 1,1 to 8,8 in the search area. The designated block provides a ninth matching block.

The motion detection and motion compensation circuit 16 carries out block matching between the picture block S2 and each of the nine matching blocks to determine which of the nine matching blocks most closely matches the picture block S2. The difference between each matching block and the picture block S2 is represented by a difference absolute value sum. The shift, relative to the designated block, of the matching block having the minimum difference absolute value sum is adopted as the secondary motion vector Vi with half-pixel precision.

The motion detection and motion compensation circuit 16 combines the secondary motion vector Vi with the previously-obtained primary motion vector MVi to generate the desired motion vector MVH with half-pixel precision. Finally, the motion detection and motion compensation circuit 16 supplies the matching block that most closely matches the picture block S2 as the reference block S3, and provides the block of differences between the picture block S2 and the reference block S3 as the difference block S4.

The practical construction of the motion detection and motion compensation circuit 16 will be discussed with reference to FIG. 4. The primary motion detector circuit 21 derives the primary motion vector MVi from the picture block S2 and the reference picture S12, and supplies the primary motion vector MVi to the interpolation address generating circuit 22 as primary motion vector data S21.

The interpolation address generating circuit 22 consists of a read-only memory, and converts pixel positions in the reference picture indicated by the primary motion vector MVi into corresponding address data, which it provides as interpolation address data S22.

The block/raster converting circuit 23 converts the blocks of the reference picture S12 into a raster signal. The raster signal is fed into the parallelizing circuit 24, and the resulting parallel pixel data S23 are successively written into the multi-port Video Random Access Memory (VRAM) 25.

The multi-port VRAM 25 reads out the parallel pixel data of the search area of the reference picture in which interpolation is to be performed in response to the interpolation address data S22 received from the interpolation address generating circuit 22. The resulting parallel pixel data S24 are fed to the half-pixel interpolating circuit 26.

The half-pixel interpolating circuit 26 receives the pixel data S24 from the VRAM 25 and generates nine blocks of parallel half-pixel data S25A through S25I. The block serializing circuit 27 receives the nine blocks of parallel half-pixel data S25A through S25I and serializes them to provide the nine matching blocks S26A through S26I. The nine matching blocks include the designated block indicated by the primary motion vector MVi. The nine matching blocks S26A through S26I are fed into the motion vector determining circuit 28.

The motion vector determining circuit 28 calculates a block of differences between the delayed picture block S27, which is the picture block S2 fed through the delay circuit 29, and each of the nine matching blocks S26A through S26I, respectively. The motion vector determining circuit 28 also calculates a difference absolute value sum for each block of differences.

The motion vector determining circuit 28 then examines the difference absolute value sum for each of the nine blocks of differences to determine which of the nine blocks of differences has the least difference absolute value sum, and establishes the shift, relative to the designated block, of the matching block corresponding to the block of differences having the least difference absolute value sum as the secondary motion vector Vi with half-pixel precision.

The motion vector determining circuit 28 generates the motion vector MVH with half-pixel precision by combining the secondary motion vector Vi with the primary motion vector MVi received from the primary motion detector circuit 21. The motion vector determining circuit 28 also selects the one of the nine matching blocks S26A through S26I that has the least difference absolute value sum as the reference picture block S3, and selects the one of the nine blocks of differences corresponding to the selected matching block as the difference block S4.

(2-1) CONSTRUCTION OF THE PARALLELIZING CIRCUIT 24 AND THE MULTIPORT RAM 25

The parallelizing circuit 24 will next be described in detail with reference to FIG. 5, which shows a practical example of the construction of the parallelizing circuit 24. In this example, the parallelizing circuit 24 is composed of two FIFO (First In First Out) memories 31 and 32 into which pixel data received from the block/raster converting circuit 23 are alternately written. This parallelizes the received pixel data to arrange them into 16-bit groups of two pixel data each, which are sequentially provided as parallel pixel data S23. The 8-bit pixel data from the block/raster converting circuit, e.g., the data for pixels 0, 1, 2, 3, 4, 5, . . . are first alternately written into each of the FIFO memories 31 and 32. Thus, for example, the FIFO memory 31 stores the data for pixels 0, 2, 4, . . . , and the FIFO memory 32 stores the data for pixels 1, 3, 5, .... The pixel data are then simultaneously read out of the FIFO memories and are fed into the VRAM 25 in pairs via a 16-bit data path. Thus, the pixel data for pixels 0 and 1 are first read into the 16-bit data path, followed by the pixel data for pixels 2 and 3; 4 and 5; . . . , as parallel pixel data S23.

The addressing provided in the multi-port VRAM 25 is such that one memory address corresponds to each of the parallel pixel data received from the parallelizing circuit 24 through the delay circuit 33, so that the addressing requirements are reduced to half. The plane in which one memory address refers to two pixel data will henceforth be referred to as the "compressed plane".

In the compressed plane, each of the parallel pixel data is, for example, 16 bits, and the 8 most significant bits are called the high-order bits (indicated by "M") and the 8 least significant bits are called the low-order bits (indicated by "L"). Therefore, it is possible to divide the 16-bit parallel pixel data complimentarily into high-order bits representing, for example, even-numbered pixels, and low-order bits representing, for example, odd-numbered pixels.

(2-2) CONSTRUCTION OF THE HALF-PIXEL INTERPOLATING CIRCUIT 26 AND THE BLOCK SERIALIZING CIRCUIT 27

Figure 6:
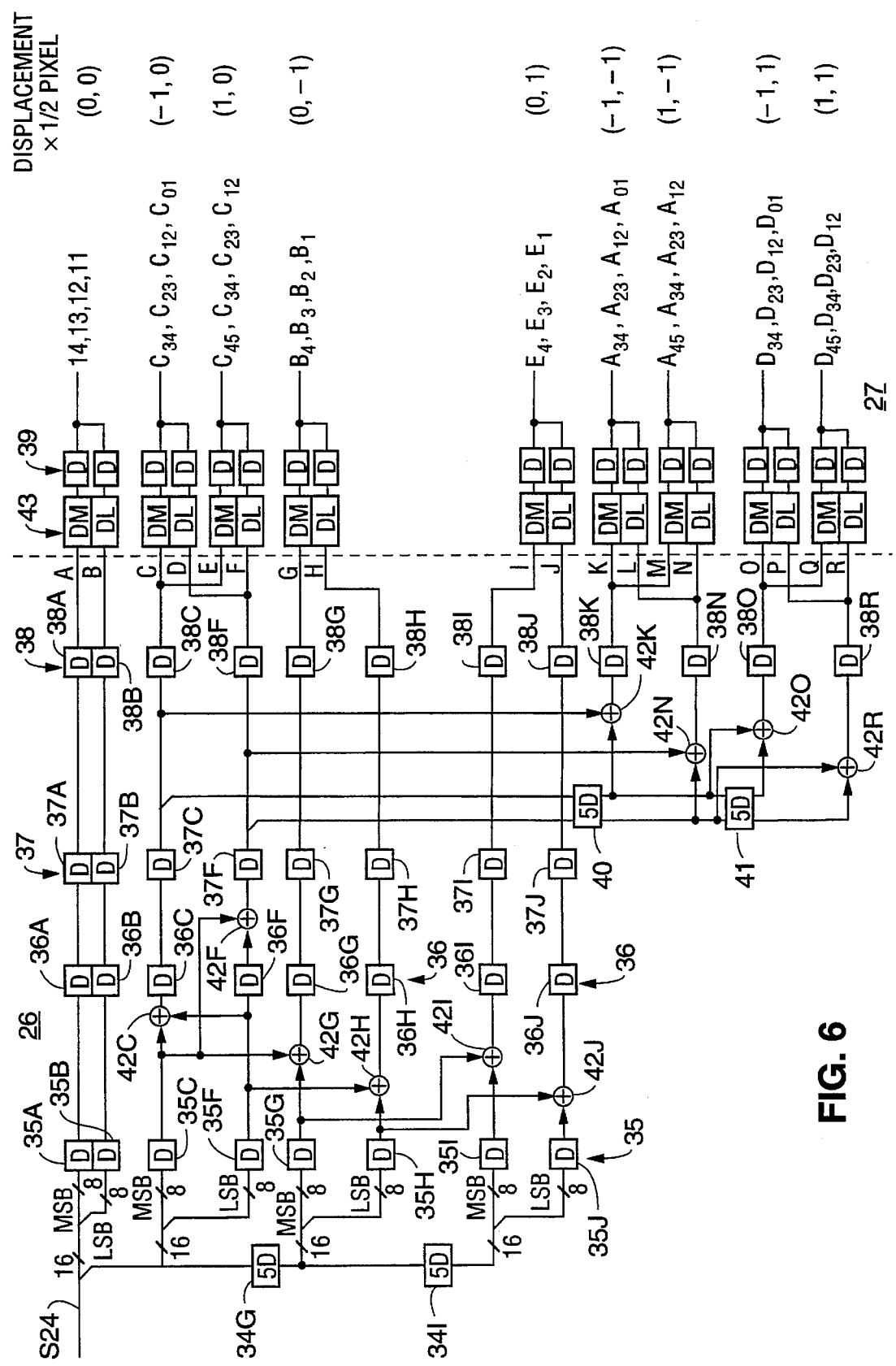
FIG. 6 is a block diagram showing an embodiment of the half-pixel interpolating circuit and the block serializing circuit.

The half-pixel interpolating circuit 26 and the block serializing circuit 27 are constructed as shown in FIG. 6. The half-pixel interpolating circuit 26 performs interpolation in the parallelized state, and the block serializing circuit 27 block-serializes the resulting parallel half-pixel data, making it possible to obtain each matching block and the difference absolute value sum of each matching block in a time corresponding to one block.

In the following description of FIG. 6, an interpolation pixel (indicated by x, Δ, and □ in FIG. 2) formed by interpolation between two real pixels (indicated by ○ in FIG. 2) of the reference picture by the half-pixel interpolating circuit 26 will be called a half pixel. The half-pixel interpolating circuit receives from the multi-port VRAM 25 the parallel pixel data S24 for the search area designated by the primary motion vector MVI, and branches the received parallel pixel data for the search area into nine pairs of parallel paths A through R. One pair of parallel paths A and B corresponds to the designated block, i.e., the block that has the pixel indicated by the primary motion vector MVi at its top, left-hand corner. The other eight pairs of parallel paths C through R each correspond to blocks obtained by shifting the designated block by −½, 0, and +½ pixel in each of the x- and y-directions. Each of the eight pairs of parallel paths therefore generates one 8×4 block of parallel half pixel data corresponding to moving the designated block by −½, 0, and +½ pixel in each of the x-and y-directions.

In the following description, it should be borne in mind that, because the pixel data processed by the half-pixel interpolating circuit 26 is 16-bit parallel pixel data, each line of the 10×10 search area has a duration of five clock cycles. Thus, the pixel data for the same pixel on adjacent lines of the search area are separated by 5 clock cycles. Interpolating is performed by adding the pixel data of adjacent pixels in the x- and y-directions. The pixel data to be added are selected by delaying the pixel data for the search area received from the multi-port VRAM 25. The interpolated data is then resynchronized by additional delays.

In FIG. 6, each one-unit delay marked D provides a delay corresponding to one clock cycle. A delay of 1 clock cycle interpolates between adjacent pixels in the x- (horizontal) direction. Each five-unit delay marked 5D provides a delay corresponding to five clock cycles. A delay of five clock cycles interpolates between adjacent pixels in the y- (vertical) direction.

In FIG. 6, the paths A and B provide the high-order bits and the low-order bits, respectively, of the parallel pixel data of the search area S24. In the paths marked A and B, the parallel pixel data S24 received from the VRAM 25 are divided into the high-order bits path A and the low-order bits path B. The data in each path are respectively delayed by the four one-unit delays 35A, 36A, 37A, and 38A; and 35B, 36B, 37B, and 38B before being delivered to the serializer 27, where the parallel pixel data of the designated block are selected. No interpolation is performed in paths A and B.

The paths C and F provide the high-order bits and the low-order bits, respectively, of the parallel half-pixel data of the matching block obtained by shifting the designated block by one half of a pixel in the minus x-direction. The paths C and F also provide the high-order bits and the low-order bits, respectively, of the parallel half-pixel data of the matching block obtained by shifting the designated block by one half of a pixel in the plus x-direction. To provide these parallel half-pixel data, interpolation is carried out in the horizontal direction only.

Path C provides the high-order bits of the parallel half-pixel data of the matching blocks obtained by shifting the designated block in the plus and minus x-directions by summing the high-order bits and the low-order bits of the same parallel pixel data of the search area. In path C, the high order bits and the low order bits of the same parallel pixel data of the search area S24 are delayed by the one-unit delays 35C and 35F, respectively, and the delayed high-order bits and low order bits are summed in the adder 42C. The resulting half-pixel data are then delayed by the three one-unit delays 36C, 37C, and 38C to synchronize them with the pixel data in paths A and B, and are delivered via the path C to the serializer 27, where the high-order bits of the parallel half-pixel data of the matching block obtained by shifting the designated block in the minus x-direction are selected. The half-pixel data are also delivered via the path E to the serializer 27, where the high-order bits of the parallel half-pixel data of the matching block obtained by shifting the designated block in the plus x-direction are selected. The minus x-direction is distinguished from the plus x-direction when the half-pixel data are selected by the serializer, as will be described below.

Path F provides the low-order bits of the parallel half-pixel data by adding the high-order bits of the parallel pixel data of the search area S24 to the low-order bits of the previous parallel pixel data S24. In path F, the high-order bits of the parallel pixel data S24 are delayed by the one one-unit delay 35C, and the low order bits are delayed by the two one-unit delays 35F and 36F before being summed in the adder 42F. The resulting half-pixel data are then delayed by the two one-unit delays 37F and 38F to synchronize them with the pixel data in paths A and B, and are delivered via the path D to the serializer 27, where the low-order bits of the parallel half-pixel data of the matching block obtained by shifting the designated block in the minus x-direction are selected. The half-pixel data are also delivered via the path F to the serializer, where the low-order bits of the parallel half-pixel data of the matching block obtained by shifting the designated block in the plus x-direction are selected.

The paths G and H provide the high-order bits and the low-order bits, respectively, of the parallel half-pixel data of the matching block obtained by shifting the designated block by one half of a pixel in the minus y-direction. To provide these half pixel data, interpolation is carried out in the vertical direction only.

Path G provides the high-order bits of the parallel half-pixel data by adding the high-order bits of the parallel pixel data of the search area S24 to the high-order bits of the parallel pixel data of the same pixel in the previous line of the search area. The parallel pixel data S24 are delayed by the 5-unit delay 34G before being split into high-order and low-order bits. The high order bits are then delayed by the one-unit delay 35G before being fed to the adder 42G. Also fed to the adder 42G are the high order bits of the parallel pixel data from the search area, delayed by the one-unit delay 35C. The resulting half-pixel data from the adder 42G are passed through the three one-unit delays 36G, 37G, and 38G before being delivered via the path G to the serializer 27, where the high-order bits of the matching block obtained by shifting the designated block by one half of a pixel in the minus y-direction are selected.

Path H operates similarly to path G, except that the low-order bits from the 5-unit delay 34G are further delayed by the one-unit delay 35D before being added by the adder 42H to the low-order bits from the one-unit delay 35F. The resulting half-pixel data are then delayed by the three one-unit delays 36H, 37H, and 38H to synchronize them with the pixel data in paths A and B, before they are delivered via the path H to the serializer 27, where the low-order bits of the matching block obtained by shifting the designated block by one half of a pixel in the minus y-direction are selected.

The paths I and J provide the high-order bits and the low-order bits, respectively, of the parallel half-pixel data of the matching block obtained by shifting the designated block by one half of a pixel in the plus y-direction. To provide these half pixel data, interpolation is carried out in the vertical direction only.

Path I provides the high-order bits of the parallel half-pixel data by adding the high-order bits of the parallel pixel data of the search area to the high-order bits of the parallel pixel data of the same pixel in the following line of the search area. The parallel pixel data of the search area S24 are first delayed by the 5-unit delay 34G before being split into high-order and low-order bits. The high order bits are then additionally delayed by the one-unit delay 35G before being fed to the adder 42I. The parallel pixel data are additionally delayed by the 5-unit delay 34I before being split into high-order and low-order bits. The high order bits are then additionally delayed by the one-unit delay 35I before also being fed to the adder 42I. The resulting half-pixel data from the adder 42I are passed through the three one-unit delays 36I, 37I, and 38I to synchronize them with the pixel data on the paths A and B, before being delivered via the path I to the serializer 27, where the high-order bits of the matching block obtained by shifting the designated block by one half of a pixel in the plus y-direction are selected.

Path J operates similarly to path I, except that the low-order bits from the 5-unit delay 34G are further delayed by the one-unit delay 35H before being added by the adder 42J to the low-order bits from the second five unit delay 34I, additionally delayed by the one-unit delay 35J. The resulting half-pixel data are then delayed by the three one-unit delays 36J, 37J, and 38J to synchronize them with the pixel data in paths A and B, before they are delivered via the path J to the serializer 27, where the low-order bits of the matching block obtained by shifting the designated block by one half of a pixel in the plus y-direction are selected.

Paths K through R provide half pixel data for the matching blocks obtained by shifting the designated block by one half of a pixel in both the x-and y-directions. These half pixel data are generated by interpolation between already-generated half pixel data.

Paths K and N provide the high-order bits and the low-order bits, respectively, of the matching block obtained by shifting the designated block by one half of a pixel in the minus y-direction and in both the plus and minus x-directions. To provide this half pixel data, interpolation is carried out between already-generated half-pixel data.

Path K provides the high-order bits of the parallel half-pixel data of the matching blocks obtained by shifting the designated block in the minus y-direction and in the plus and minus x-directions by summing the high-order bits of the parallel half pixel data shifted in the x-direction from path C and the high-order bits of the parallel half pixel data shifted in the x-direction from path C of the previous line.

In path K, the high-order bits of the parallel half-pixel data shifted in the x-direction are taken from the path C after the one-unit delay 37C to the adder 42K. The high-order bits of the parallel half-pixel data shifted in the x-direction are fed directly to one input of the adder, and to the other input of the adder via the 5-unit delay 40. The resulting half-pixel data are then delayed by the one one-unit delay 38K to synchronize them with the pixel data in paths A and B. The half pixel data are delivered via the path K to the serializer 27, where the high-order bits of the parallel half-pixel data of the matching block obtained by shifting the designated block in the minus x-direction and the minus y-direction are selected. The half pixel data are also delivered via the path M to the serializer 27, where the high-order bits of the parallel half-pixel data of the matching block obtained by shifting the designated block in the plus x-direction and minus y-direction are selected.

Path N provides the low-order bits of the parallel half-pixel data of the matching blocks obtained by shifting the designated block in the minus y-direction and the plus and minus x-directions by adding the low-order bits of the parallel half-pixel data shifted in the x-direction from path F to the low-order bits of the parallel half-pixel data shifted in the x-direction from path F of the previous line.

In path N, the low-order bits of the parallel half-pixel data shifted in the x-direction are taken from the path F after the one-unit delay 37C to the adder 42N. The low-order bits of the parallel half-pixel data shifted in the x-direction are fed directly to one input of the adder 42N, and are fed to the other input of the adder 42N via the 5-unit delay 40. The resulting half-pixel data are then delayed by the one one-unit delay 38N to synchronize them with the pixel data in paths A and B. The half pixel dam are delivered via the path L to the serializer 27, where the low-order bits of the parallel half-pixel data of the matching block obtained by shifting the designated block in the minus x-direction and the minus y-direction are selected. The half pixel data are also delivered via the path N to the serializer 27, where the low-order bits of the parallel half-pixel data of the matching block obtained by shifting the designated block in the plus x-direction and minus y-direction are selected.

Paths 0 and R provide the high-order bits and the low-order bits, respectively, of the matching blocks obtained by shifting the designated block by one half of a pixel in the plus y-direction and in both the plus and minus x-directions. To provide these half pixel data, interpolation is carried out between already-generated half-pixel data.

Path 0 provides the high-order bits of the parallel half-pixel data of the matching blocks obtained by shifting the designated block in the plus y-direction and in the plus and minus x-directions by summing the high-order bits of the parallel half-pixel data shifted in the x-direction from path C and the high-order bits of the parallel half-pixel data shifted in the x-direction from path C of the following line.

In path 0, the high-order bits of the parallel half-pixel data shifted in the x-direction are taken from the path C after the one-unit delay 37C to the adder 42O. The high-order bits of the parallel half-pixel data shifted in the x-direction are fed to one input of the adder via the 5-unit delay 40, and to the other input of the adder via the 5-unit delay 40 and the 5-unit delay 41. The resulting half-pixel data are then delayed by the one one-unit delay 38O to synchronize them with the pixel data in paths A and B. The half pixel data are delivered via the path O to the serializer 27, where the high-order bits of the parallel half-pixel data of tile matching block obtained by shifting the designated block in the minus x-direction and the plus y-direction are selected, The half pixel data are also delivered via the path Q to the serializer 27, where the high-order bits of the parallel half-pixel data of the matching block obtained by shifting the designated block in the plus x-direction and plus y-direction are selected.

Path R provides the low-order bits of the parallel half-pixel data of the matching blocks obtained by shifting the designated block in the plus y-direction and the plus and minus x-directions by adding the low-order bits of the parallel half-pixel data shifted in the r-direction from the path F to the low-order bits of the parallel half-pixel data shifted in the x-direction of the following line from the path F.

In path R, the low-order bits of the parallel half-pixel data shifted in the x-direction are taken from fire path F after the one-unit delay 37C to the adder 42R. The low-order bits of the parallel half-pixel data shifted in the x-direction are fed to one input of the adder 42R via the 5-unit delay 40, and are fed to the other input of the adder 42R via the 5-unit delay 40 and the 5-unit delay 41. The resulting half-pixel data are then delayed by the one one-unit delay 38R to synchronize them with the pixel data in paths A and B. The half-pixel data are delivered via the hath P to the serializer 27, where the low-order bits of the parallel half-pixel data of the matching block obtained by shifting file designated block in the minus x-direction and the plus y-direction are selected. The half pixel data are also delivered via the path R to the serializer 27, where as the low-order bits of the parallel half-pixel data of the matching block obtained by shifting the designated block in the plus x-direction and plus y-direction are selected.

Figure 9:
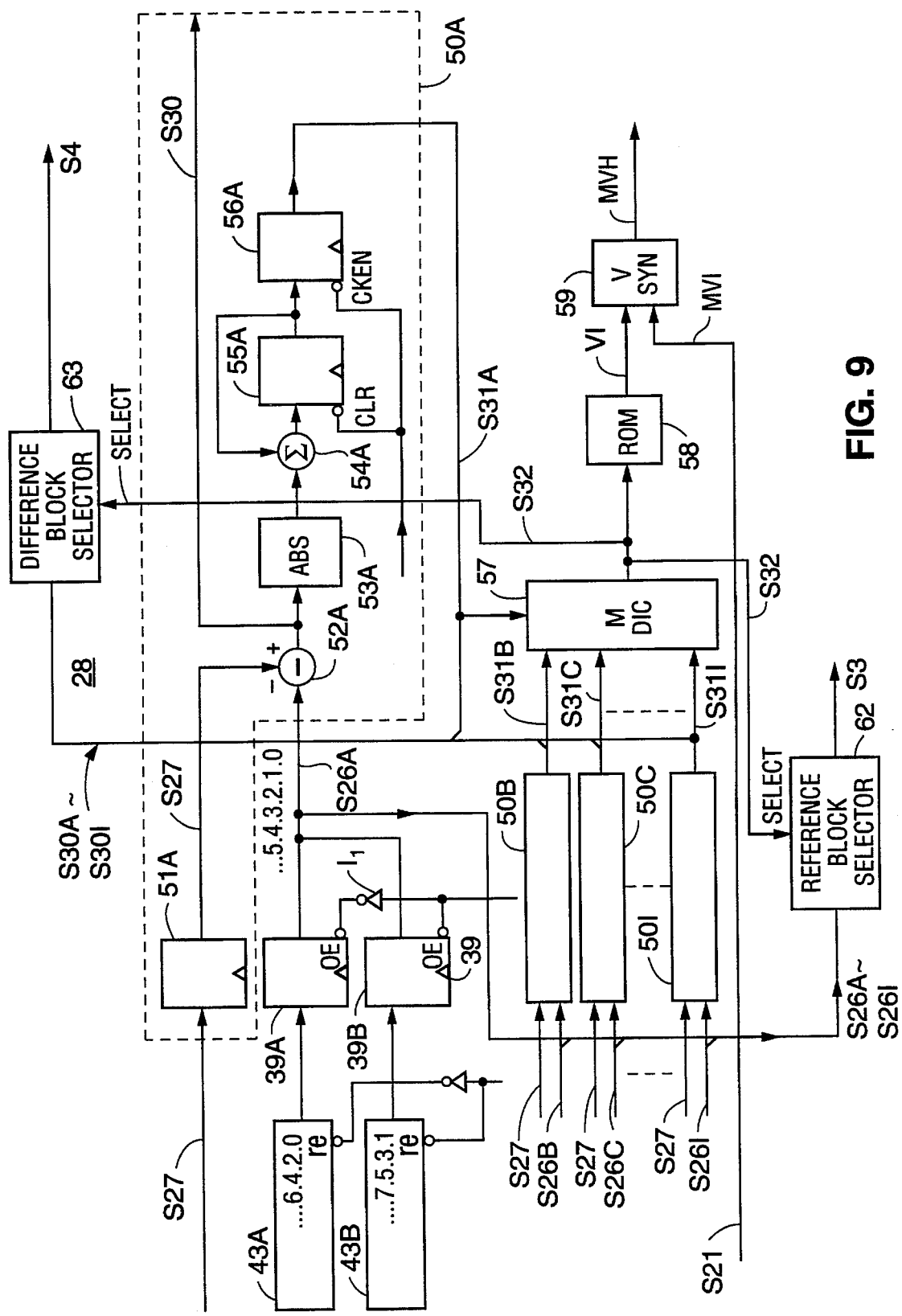
FIG. 9 is a block diagram illustrating the motion vector determining circuit.

FIG. 6 also shows details of the block serializing circuit 27. The nine pairs or data paths generated by the half-pixel interpolating circuit 26 are each fed into a pair of FIFO memories in the FIFO memory group 43, the outputs of which are each fed to the one-unit delay 39. The construction the pair of FIFO memories 43 and the pair of one-unit delays to which the pair of data paths A and B is connected is shown in more detail in FIG. 9. In FIG. 9, the high-order bits of the designated block in the data path A are fed into the FIFO memory 43A and the low-order bits of the designated block in the data path B are fed into the FIFO memory 43B. A read pulse is fed to the read terminal re of the FIFO memory 43B, and to the read terminal re of the FIFO memory 43A via the inverter I1. The outputs of the FIFO memories 43A and 43B are respectively fed to the one-unit delays 39A and 39B, which are also alternately clocked. The output terminals of the one-unit delays 39A and 38B both feed the output line.

The high-order bits of the parallel-bit pixel data of the designated block stored in the FIFO memory 43A and the low-order bits of the parallel-bit pixel data of the designated block stored in the FIFO memory 43B are alternately read out onto the output path 26A. Thus, the 64 pixel data of the designated block appear serially on the output path 26A as one of the nine matching blocks generated by the block serializing circuit 27.

Similar serializing operations are carried out on the eight pairs of parallel data paths C through R, each of which pairs carries the high-order bits and the low-order bits of the other eight matching blocks obtained by shifting the designated block by −½, 0, and +½ pixel in each of the x- and y-directions.

Figure 7:
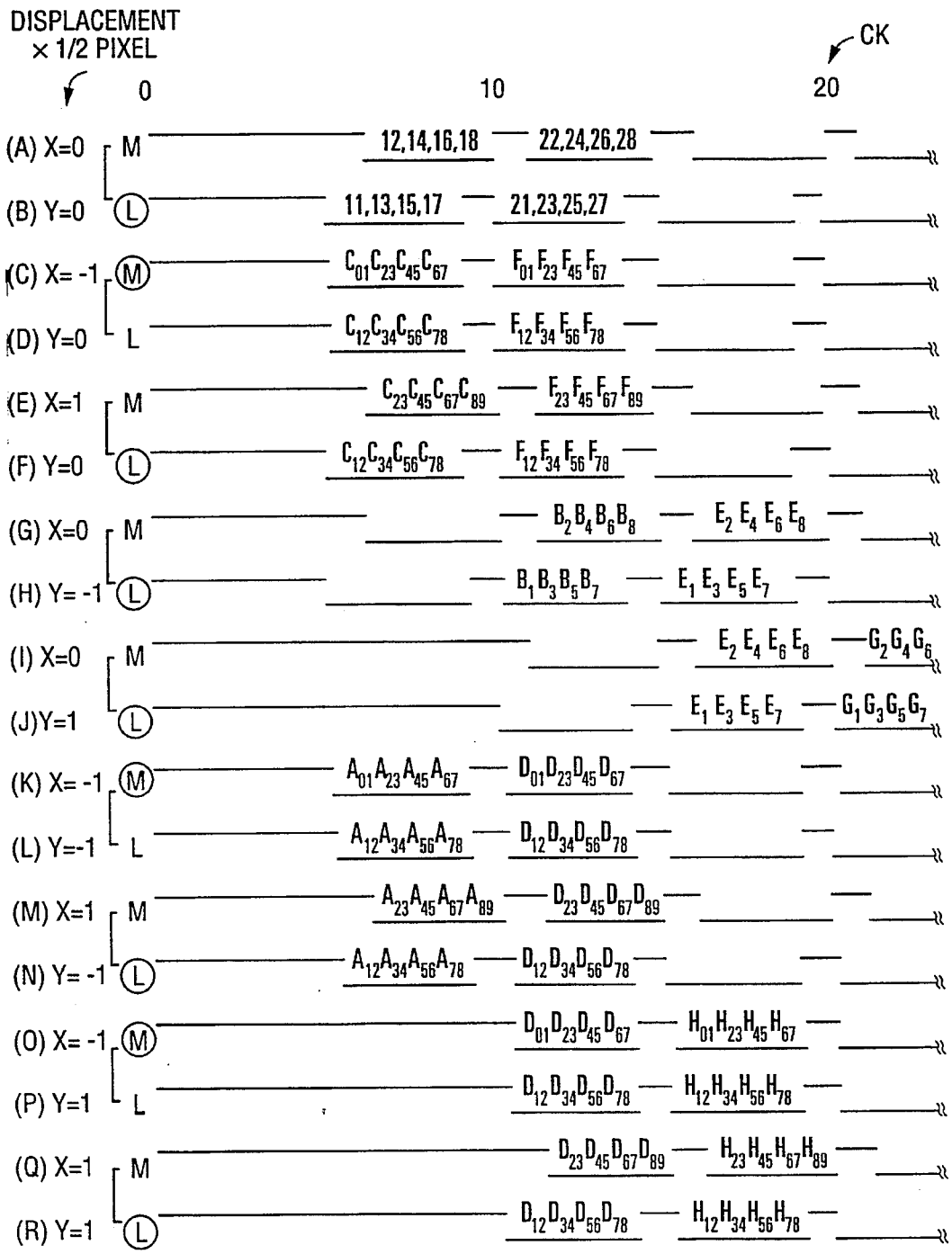
FIG. 7 is one half of a timing chart showing pixel data written and read by means of write and read signals supplied to the FIFO memory set.
Figure 8:
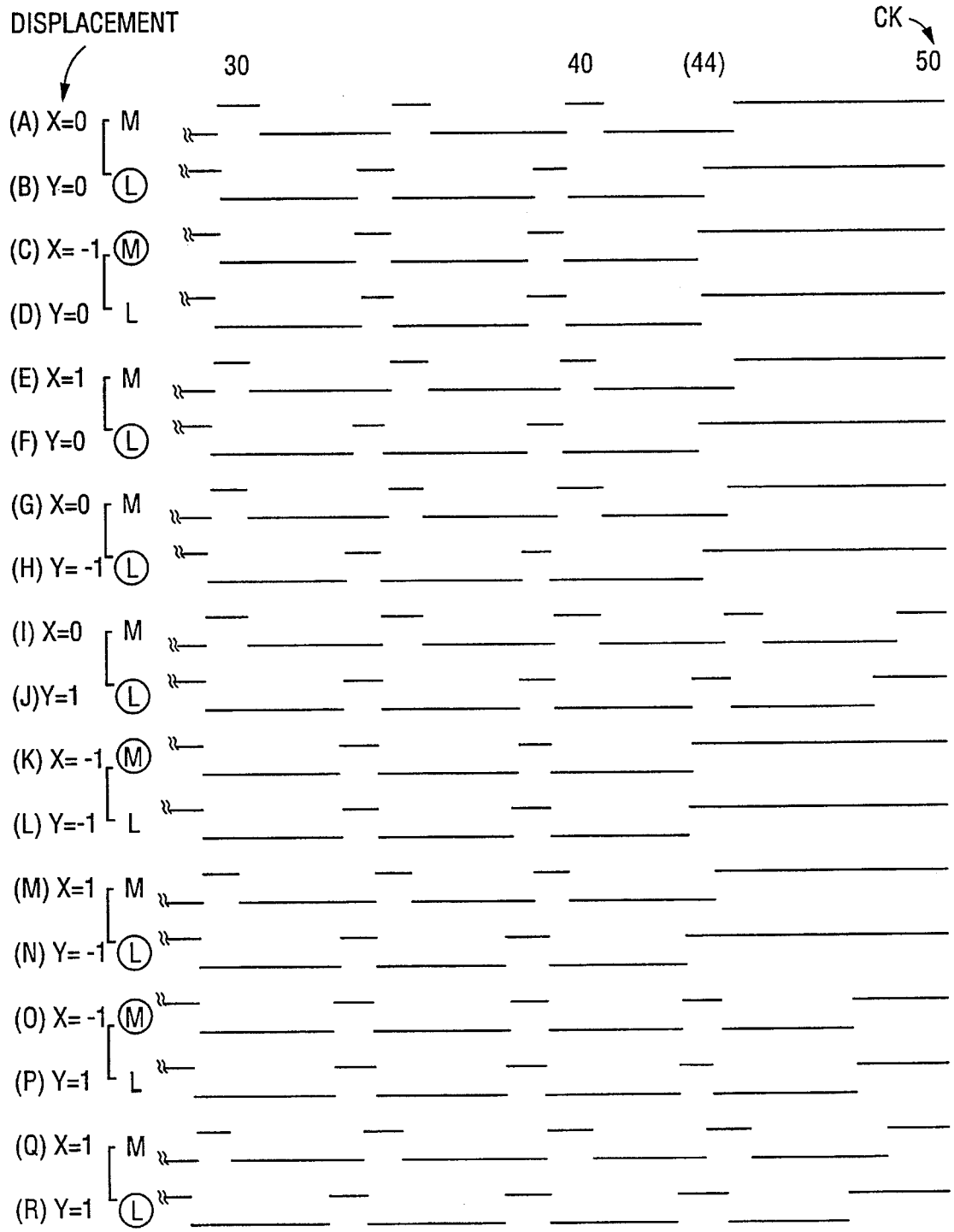
FIG. 8 is the other half of a timing chart showing pixel data written and read by means of write and read signals supplied to the FIFO memory set.

The block serializing circuit 27 selects the parallel half-pixel data to be included in each matching block from the blocks of interpolation pixels generated by the half-pixel interpolating circuit 26, as shown in FIGS. 7 and 8. For example, the half-pixel data for the matching blocks obtained by shifting the reference block in both the plus x-direction and the minus x-direction are generated in the paths C and F. Thus, for example, the pixel data for the half pixels C01, C12, C23, through C89 are presented both to the FIFO memory pair 43C and 43D, and to the memory pair 43E and 43F. Writing pulses are presented to the memory pair 43C and 43D such that the pixel data for the half pixels C01, C12, C23, through C78 are written into the FIFO memory pair 43C and 43D, since these pixel data are required for the matching block obtained by shifting the designated block in the minus x-direction. On the other hand, writing pulses are presented to the memory pair 43E and 43F such that the pixel data for the half pixels C12, C23, through C89 are written into the FIFO memory pair 43E and 43F, since these pixel data are required for the matching block obtained by shifting the designated block in the plus x-direction. The timing of the writing of the data into each of the FIFO memories over part of the search area is illustrated in FIGS. 7 and 8.

(2-3) CONSTRUCTION OF THE MOTION VECTOR DETERMINING CIRCUIT 28

FIG. 9 shows the construction of the motion vector determining circuit 28. The motion vector determining circuit 28 receives the nine matching blocks S26A through S26I from the block serializing circuit 27. The motion vector determining circuit 28 includes nine sets of difference absolute value sum calculating circuits 50A through 50I, each of which calculates the difference absolute value sum for one of the nine matching blocks. The operation of the difference absolute value sum calculating circuits 50A through 50I will be now described using the difference absolute value sum calculating circuit 50A as an example.

Figure 4:
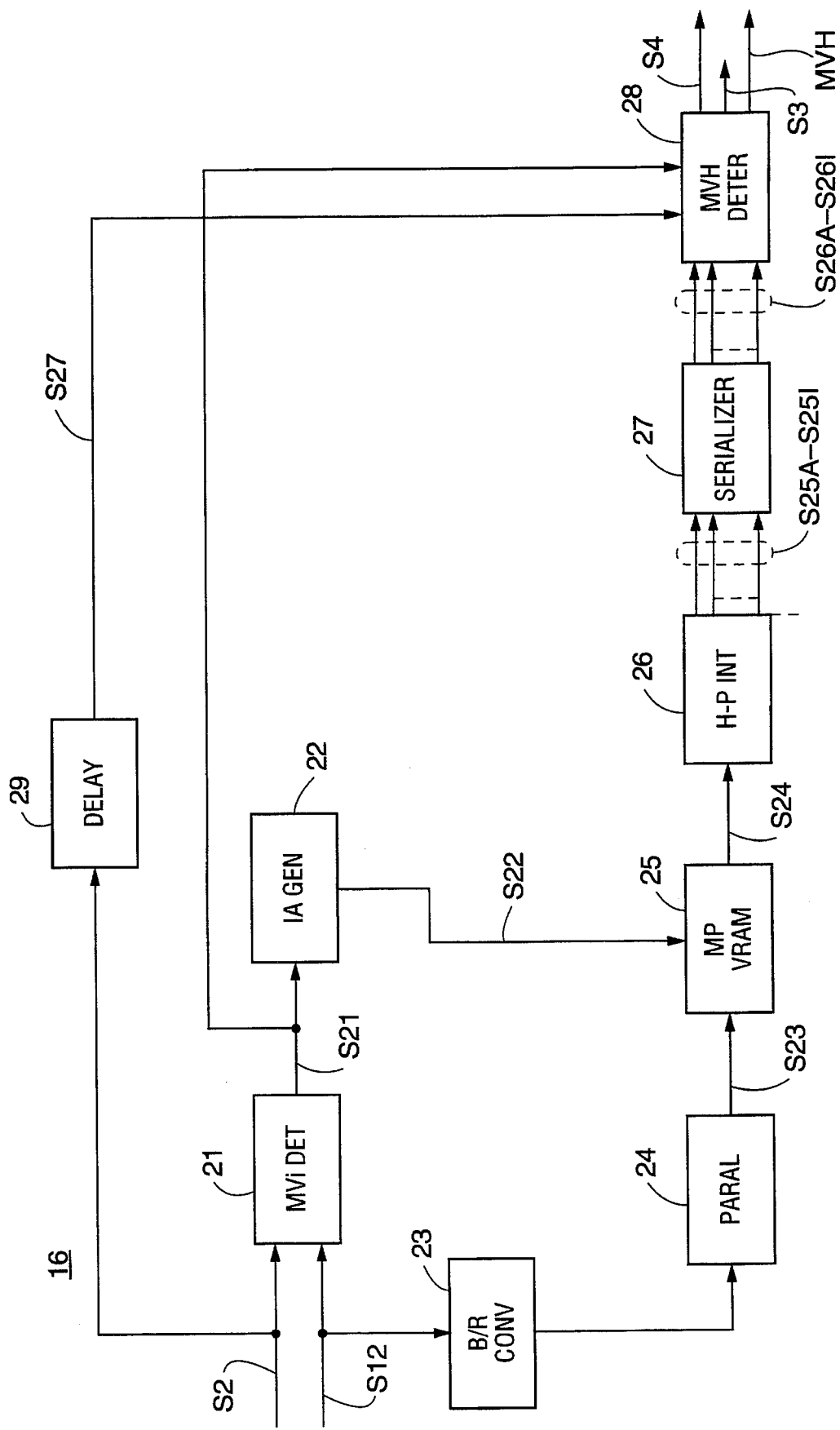
FIG. 4 is a block diagram showing the construction of the motion detection and motion correction circuit.

The difference absolute value sum calculating circuit 50A receives the matching block 26A from the delay circuits 39A and 39B in the block parallelizing circuit 27, and the delayed picture block S27, which is the picture block S2 delayed by the delay circuit 29 (FIG. 4). In the difference absolute value sum calculating circuit 50A, the subtracting circuit 52A determines the pixel-by-pixel difference between the matching block S26A, and the delayed picture block S27, additionally delayed by the delay circuit 51A. The resulting block of differences is fed as the residual block S30A into the absolute value circuit 53A, which determines the absolute value of the residual block S30A. The block of the absolute values of the residual block S30A is fed from the absolute value circuit 53A to the accumulator formed by the adder 54A and the delay circuit 55A. The accumulator generates a difference absolute value sum for the block of absolute values. The difference absolute value sum is fed to the delay circuit 56A, which provides the difference absolute value sum signal S31A to the minimum value determining circuit 57. The difference absolute value sum signals S31A to S31I from the difference absolute value sum calculating circuits 50A through 50I respectively indicate the difference absolute value sum for each of the nine residual blocks S30A through S30I, each representing the differences between the delayed picture block S27 and one of the nine matching blocks consisting of the designated block and the blocks obtained by shifting the designated block by −½, 0, and +½ pixel in each of the x- and y-directions.

The output of the minimum value determining circuit 57 feeds to the read-only memory 58 the selection signal S32, which indicates which of the residual blocks S30A through S30I has the least difference absolute value sum, and therefore which of the corresponding nine matching blocks S26A through S26I most closely matches the picture block S2. The read-only memory provides the secondary motion vector Vi with half-pixel precision in accordance with the selection signal S32.

The vector synthesizing circuit 59 combines the secondary motion vector Vi with half-pixel precision with the primary motion vector MVi with one-pixel precision generated by the primary motion detector circuit 21 to generate motion vector MVH with half-pixel precision.

The reference block selector 62 receives the nine matching blocks S26A through S26I from the block serializer 27, and also receives the selection signal S32 from the minimum value determining circuit 57. The reference block selector 62 selects the one of the nine matching blocks S26A through S26I indicated by the selection signal S32 as the reference block S3.

The difference block selector 63 receives the nine residual blocks S30A through S30I from the subtractor, such as the subtractor 52A, in each of the difference absolute value sum calculating circuits 50A through 50I, and also receives the selection signal S32 from the minimum value determining circuit 57. The difference block selector 63 selects the one of the nine residual data blocks S30A through S30I indicated by the selection signal S32 as the difference block S4.

Alternatively, the difference block selector 63 may be dispensed with, and the difference block S4 may be generated by subtracting the reference block S3 from the picture block S2 using a suitable subtractor. Alternatively, the reference block selector 62 may be dispensed with, and the reference block S3 may be generated by subtracting the difference block S4 from the picture block S2 using a suitable subtractor.

(3) OPERATION AND EFFECTS OF THE INVENTION

The operation of the above-described construction of the circuit according to the invention will now be described in detail.

In the digital motion picture signal compressor shown in FIG. 3, the picture block S2 is fed from the pre-processing circuit 2 and the reference picture S12 is fed from the frame memory 14 into the motion detection and motion compensation circuit 16.

In the motion detection and motion compensation circuit 16 shown in FIG. 4, the picture block S2 is provided to the primary motion detector circuit 21, which provides the primary motion vector MVi with one-pixel precision.

The reference picture S12 is provided to the block/raster converting circuit 23, the output of which is fed to the parallelizing circuit 24, which converts the 8-bit pixel data into 16-bit parallel pixel data representing pairs of pixels. The parallel pixel data S24 are fed from the parallelizing circuit into the multi-port VRAM 25, so that block matching with half-pixel precision can be carried out in the search area surrounding the pixel designated by the primary motion vector MVi.

The addressing in the multi-port VRAM 25 is such that one address identifies the parallel pixel data for 2 pixels received from the parallelizing circuit 24 through the delay circuit 33. This allows the address space to be halved. The plane indicated by the half address space will be referred to as "the compressed plane".

The process of reading the pixel data for the search area indicated by the primary motion vector MVi will now be described with reference to FIG. 10, which depicts the compressed plane, and to FIG. 11, which depicts the picture plane.

In both planes, the mark ○ indicates a real pixel, the marks Δ and x indicate half-pixels, and the mark ⊙ indicates the original pixel identified by the primary motion vector MVi with one-pixel precision. The Figures show the whole search area in the x-direction, and part of the search area in the y-direction.

Figure 10:
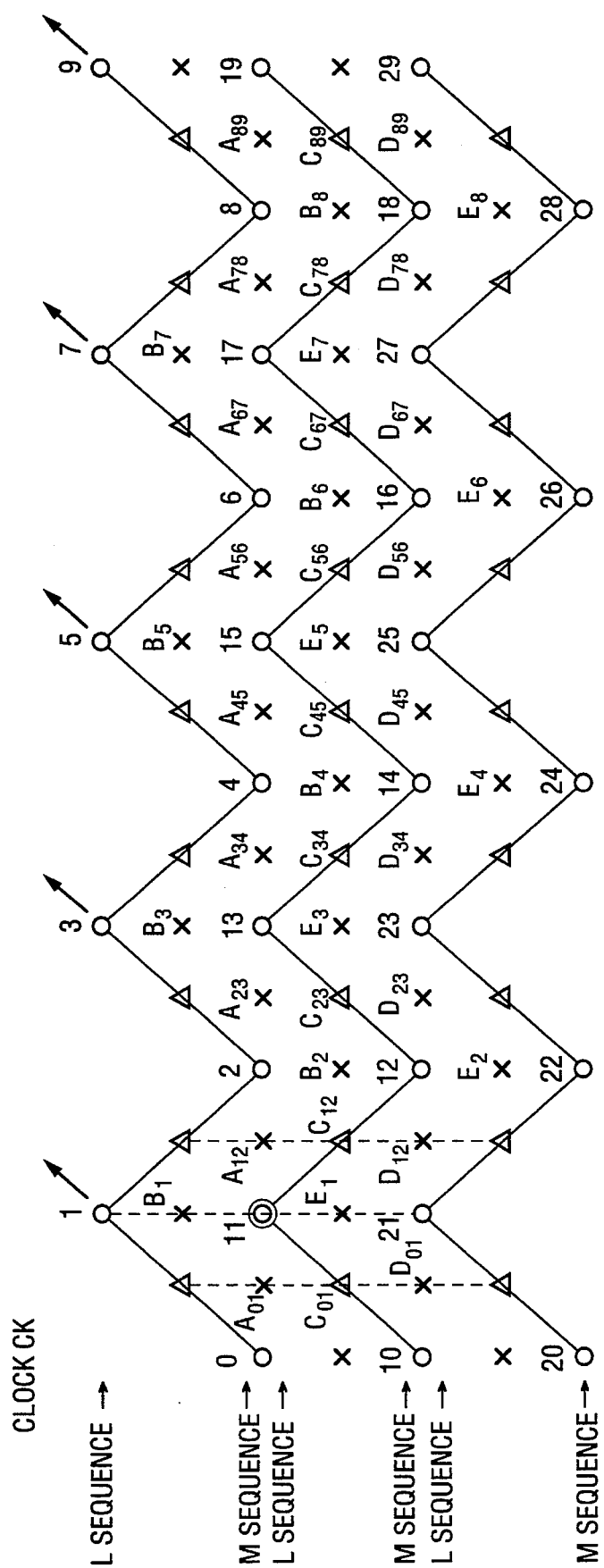
FIG. 10 is a chart showing the relationship between the half pixels obtained by interpolation and the real pixels in the compressed plane.

In the compressed plane shown in FIG. 10, the half-pixel formed by interpolation in the x-direction between the real pixels of address 0 and address 1 is shown with the mark Δ on the line joining addresses 0 and 1, and is indicated as half pixel $A_{01}$. Similarly, the half-pixel which is formed by interpolation in the x-direction between the real pixels of address 1 and address 2 is shown with the mark Δ on the line connecting addresses 1 and 2, and is identified as half-pixel $A_{12}$, and so on.

The half-pixels indicated by the mark x are formed by interpolation in the y-direction between the real pixels marked ○, or by interpolation in the y-direction between the half-pixels marked Δ, as shown by dotted lines. A similar convention is used in the picture plane shown in FIG. 11.

To generate the interpolation pixels, the half-pixel interpolating circuit 26 shown in FIG. 6 begins reading the 16-bit parallel pixel data S24 for the search area successively from the multi-port VRAM 25. Reading starts with the pixel corresponding to the pixel address 0, 0. As shown in FIG. 10, the interpolation process generates half pixels in the x-direction by interpolating between the high-order bits and the low-order bits of the present address (e.g., the half-pixel $A_{01}$ is generated by interpolating between the high-order bits and the low-order bits of the parallel pixel data for real pixels 0 and 1), and between the low-order bits of the present address and the high-order bits of the following address (e.g., the half-pixel $A_{12}$ is generated by interpolation between the low-order bits of the parallel pixel data for real pixels 0 and 1 and the high-order bits of the parallel pixel data for real pixels 2 and 3).

In the y-direction, half-pixels are generated by interpolating alternately between the high-order bits and between the low-order bits delayed by a delay corresponding to one line in the x-direction of the compressed plane, i.e., five clock cycles.

Processing in the compressed plane generates the required interpolation points with half-pixel precision in the picture plane, making it possible to calculate 10×3 half pixels by interpolation in 5×3 clock cycles, i.e., in half the number of clock cycles. Moreover, the nine matching blocks are generated in parallel. This means that, despite the delays required to execute the interpolation process, the nine matching blocks each of 64 half pixels can be calculated by interpolation in fewer than 64 clock cycles.

As a result of the interpolation process in the half-pixel interpolating circuit 26, a set of 50 half-pixel data is generated by interpolation on each of the eighteen data paths A through R for each picture block S2. The set of 50 half pixel data on each of the data paths includes unwanted half pixel data in addition to the 32 wanted half-pixel data that will constitute half of one matching block. The block parallelizing circuit 27 uses the FIFO memory set 43 to select the wanted half-pixel data by writing into the FIFO memory set 43 only the 32 wanted half-pixel data that will be included in each respective matching block. The wanted half-pixel data are selected by transmitting write pulses with appropriate timing to each FIFO memory in the FIFO memory set, and, after a fixed time, reading the data written into the FIFO memory set 43.

A read pulse is alternately fed to pairs of the FIFO memories in the FIFO memory set 43 in which high-order bits and low-order bits are stored, as described above with reference to FIGS. 5, 6, and 9, to generate the matching blocks by serializing the half-pixel data stored in the FIFO memory set 43.

Figure 11:
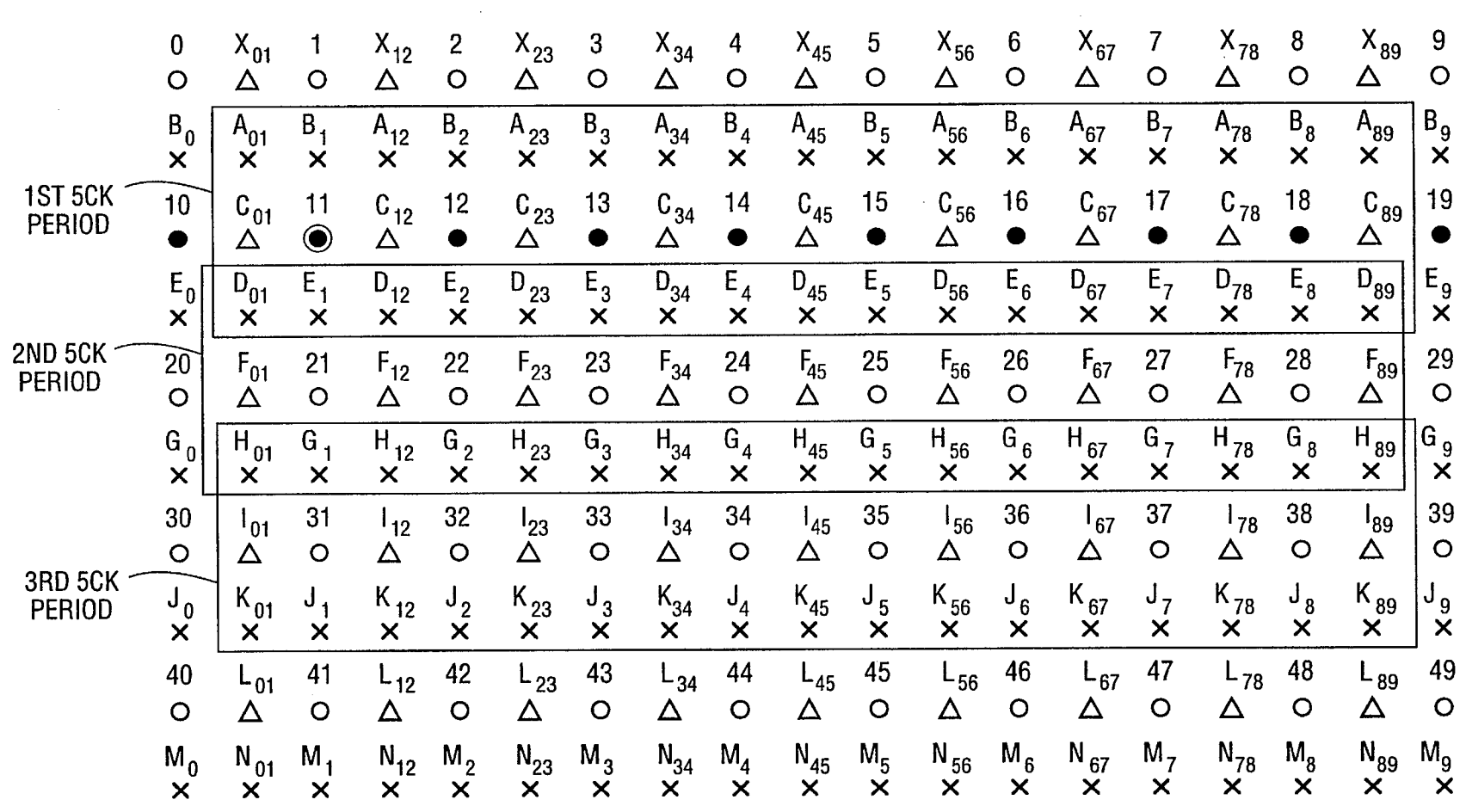

The figures in FIGS. 7 and 8 correspond to the data indicated in FIGS. 10 and 11. Data is written into the FIFO memory 43 when the write pulse (-we) is at a low level (that is, in the logical "L" state), and the written data is read out by starting the read pulse (-re) after a fixed period of time. As described above with reference to FIG. 9, the read pulses (-re) fed to the FIFO memories in each pair of FIFO memories, such as the FIFO memories 43A and 43B, are of a clock-alternate type. This enables the 8-bit pixel data represented by the high-order bits and the low-order bits stored in the pair of FIFO memories to be read sequentially to provide the matching blocks, such as the matching block S26A.

For this purpose, it is necessary for reading to be started at the point in the sequence indicated by ○ in FIGS. 7 and 8. Of the pairs of parallel half-pixel data sequences for the nine matching blocks shown, the first sequence to be completely written into the FIFO memory set 43 is written completely by the 44th clock cycle from the block pulse (which appears once every 64 clock cycles). With clock-alternate reading, a time corresponding to the full 64 clock cycles is necessary to read each matching block from each pair of FIFO memories, so that reading the pixel data must be started at the latest 20 clock cycles (64–44) earlier than the end of the current block. If the above conditions are satisfied, writing the next block will not start before reading the written data of the current block has been started.

In FIG. 6, the outputs of the block parallelizing circuit 27 are, in order from the top:

(1) the pixel data of the designated block, which is the block indicated by the motion vector MVi of one-pixel precision, derived from data paths A and B; i.e., the pixel data 11, 12, 13, . . . 18;21 . . . 28; etc.;

(2) the pixel data for the matching block obtained by shifting the designated block by one half of a pixel in the minus x-direction, derived from paths C and D, i.e., the pixel data C01, C12, C23, . . . C78; F01, . . . F78; etc.;

(3) the pixel data for the matching block obtained by shifting the designated block by one half of a pixel in the plus x-direction, derived from paths E and F, i.e., the pixel data C12, C23, C34, . . . C89; F12, . . . F89; etc.;

(4) the pixel data for the matching block obtained by shifting the designated block by one half of a pixel in the minus y-direction, derived from paths G and H, i.e., the pixel data B1, B2, B3, . . . B8; E1, . . . E8; etc.;

(5) the pixel data for the matching block obtained by shifting the designated block by one half of a pixel in the plus y-direction, derived from paths I and J, i.e., the pixel data E1, E2, E3, . . . E8; H1, . . . H8; etc.;

(6) the pixel data for the matching block obtained by shifting the designated block by one half of a pixel in the minus x-direction and the minus y-direction, derived from paths K and L, i.e., the pixel data A01, A12, A23, . . . A78; D02, . . . D78; etc.;

(7) the pixel data for the matching block obtained by shifting the designated block by one half of a pixel in the plus x-direction and the minus y-direction, derived from paths M and N, i.e., the pixel data A12, A23, A34, . . . A89; D12, . . . D89; etc.;

(8) the pixel data for the matching block obtained by shifting the designated block by one half of a pixel in the minus x-direction and the plus y-direction, derived from paths 0 and P, i.e., the pixel data D01, D12, D23, . . . D78; G01 . . . G78; etc.; and (9) the pixel data for the matching block obtained by shifting the designated block by one half of a pixel in the plus x-direction and the plus y-direction, derived from paths Q and R, i.e., the pixel data D12, D23, D34, . . . D89; G12, . . . G89; etc.

The motion vector detecting circuit 28 determines the difference absolute value sums between the matching blocks S26A through S26I, and the delayed picture block S27, and selects the one of the residual blocks S30A through S30I that has the least difference absolute value sum as the difference block S4 with half-pixel precision. The motion vector detecting circuit 28 also selects the matching block from which the residual block having the least difference absolute value sum was derived as the reference block S3 with half-pixel precision.

Finally, the motion vector detecting circuit 28 combines the secondary motion vector Vi with half-pixel precision for the selected matching block with the primary motion vector MVi of one-pixel precision to form the motion vector MVH with half-pixel precision, and the picture block of the current picture is then compressed.

With the above construction, the pixel data in the search picture S12 is parallelized by the parallelizing circuit 24, and then the half-pixel interpolating circuit 26 derives eight blocks of interpolation pixels with half-pixel precision in the area around the matching block designated by the motion vector with one-pixel precision. Then, by rearranging the interpolation pixels in the block serializing circuit 27, nine interpolation blocks displaced in the x- and y-directions are supplied to the motion vector determining circuit 28. This makes it possible to easily obtain the motion vector with half-pixel precision using a single clock without increasing the number of frame memories.

Further, by adopting a motion vector with half-pixel precision and reducing the amount of inter-frame difference information, the amount of information generated can be reduced, thereby achieving an improvement in terms of picture quality.

Further, even when an expensive dedicated LSI is used for determining the motion vector detection, the number of parts can be reduced, thereby realizing a reduction in system costs.

(4) OTHER EMBODIMENTS

Figure 5:
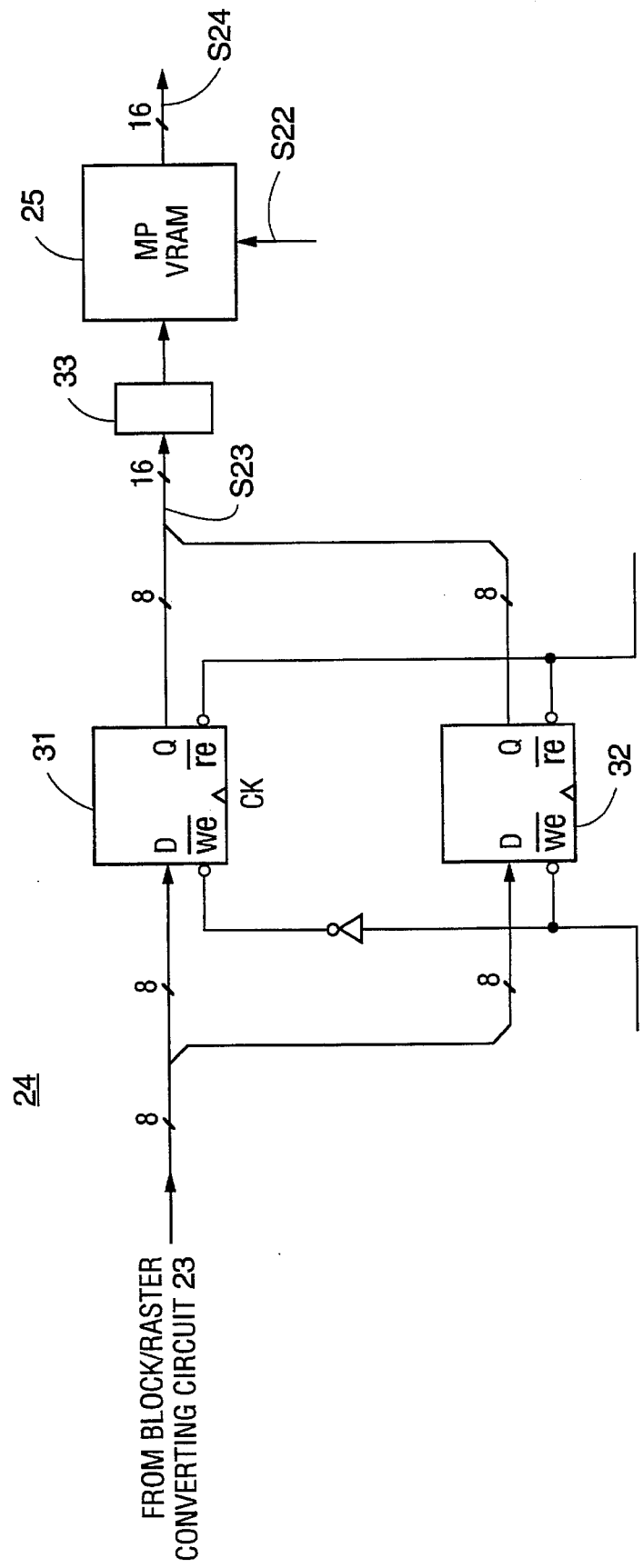
FIG. 5 is a block diagram showing an embodiment of the parallelizing circuit.

While the above embodiment has been described with reference to the parallelizing circuit 24 constructed as shown in FIG. 5, the present invention is not limited to this. It is also possible to parallelize plural pixel data with different circuit configurations.

Also, while the above embodiment has been described with reference to a half-pixel interpolating circuit 26 constructed as shown in FIG. 6, the present invention is not limited to this. It is also possible to interpolate parallelized data with different circuit configurations.

Further, while the above embodiment has been described with reference to a block serializing circuit 27 constructed as shown in FIG. 4, the present invention is not limited to this. It is also possible to block-serialize interpolated data with different circuit configurations and signal timing.

Still further, while the above embodiment has been described with reference to movement compensation being effected on only the object range, the present invention is not limited to this. It is also widely applicable to other interpolating circuits in intended for data interpolation.

As described above, in accordance with the present invention, the pixel data of the reference picture are successively transformed into parallel pixel data, and the parallel pixel data with a compressed address space are then interpolated to generate parallel half-pixel data for the half pixels in the search area designated by the primary motion vector with one-pixel precision. The half-pixel data are fed out in parallel blocks of half-pixel data, one for each of plural matching blocks obtained by displacing the block designated by the motion vector with one-pixel precision by +½, –½, and 0 vertically and horizontally. This way, it is possible to determine a motion vector with half-pixel precision by performing interpolation solely in the search area designated by the motion vector with one-pixel precision.

This makes it possible to execute interpolation processing at high speed with a substantially simplified construction compared to the prior art. This enables the motion vector with half-pixel precision to be determined easily, without increasing the number of frame memories or raising the clock frequency.

Although illustrative embodiments of the invention have been described herein in detail, it is to be understood that the invention is not limited to the precise embodiments described, and that various modifications may be practiced within the scope of the invention defined by the appended claims.

I claim:

1. Apparatus for generating a motion vector for use in compressing a digital motion picture signal, the motion picture signal including a current picture and a reference picture, each picture including plural pixel data for pixels horizontally arrayed in lines, the lines being vertically arrayed, the apparatus comprising:

means for obtaining a primary motion vector with one pixel precision between a picture block of the current picture and a designated block of the reference picture;

parallelizing means for converting the pixel data of the reference picture into parallel pixel data;

search area selecting means for selecting the parallel pixel data of a search area of the reference picture in response to the primary motion vector, the search area surrounding and including the designated block;

interpolating means for deriving a group of matching blocks of half-pixel data from the parallel pixel data of the search area, the matching blocks in the group having shifts relative to the designated block of −½, 0, and +½ pixel, horizontally and vertically, and for providing all the matching blocks in the group on exclusive parallel paths, the interpolating means deriving the matching blocks by performing interpolation on the parallel pixel data in plural parallel channels, selecting plural sets of parallel half-pixel data from the parallel half-pixel data generated in the plural parallel channels, and serializing the parallel half-pixel data in the sets of parallel half-pixel data into the exclusive parallel paths to provide the matching blocks of half-pixel data means for performing a parallel comparison of all the matching blocks in the group of matching blocks with the current block to identify a one of the matching blocks most closely matching the picture block as a reference block; and motion vector calculating means for calculating the motion vector with half-pixel precision from the primary motion vector and the shift of the reference block.

2. The apparatus of claim 1, wherein the means for obtaining a primary motion vector includes means for performing block matching between the picture block and the reference picture to obtain the designated block.

3. The apparatus of claim 1, wherein the parallelizing means includes:

two parallel FIFO memories, each having an output connected to one half of a common double-width data bus;

write clock means for alternately clocking the FIFO memories to write alternate ones of the plural pixel data of the reference picture into each of the FIFO memories; and read clock means for simultaneously clocking the FIFO memories to simultaneously read pairs of the plural pixel data onto the common double-width data bus as parallel pixel data.

4. The apparatus of claim 1, wherein the search area selecting means includes:

memory means for storing the parallel pixel data, each of the parallel pixel data being stored at one storage address; and means for generating a block of addresses in response to the primary motion vector, the block of addresses indicating the storage addresses of the parallel pixel data of the search area; and means for reading the parallel pixel data of the search area from the memory means in response to the block of addresses.

5. The apparatus of claim 4, wherein:

the primary motion vector indicates a designated pixel in the reference picture; and the means for generating a block of addresses generates a block of addresses indicating the storage addresses of the parallel pixel data corresponding to a block of 10×10 pixels extending from −1 to plus 8 pixels horizontally and vertically relative to the designated pixel.

6. The apparatus of claim 5, wherein the designated block is a block of 8×8 pixels extending from 0 to plus 7 pixels horizontally and vertically relative to the designated pixel.

7. The apparatus of claim 5, wherein the parallel pixel data of the search area consists of 50 parallel pixel data.

8. The apparatus of claim 1, wherein the interpolating means comprises:

means for dividing the parallel pixel data into high-order bits and low-order bits;

means for delaying only the high-order bits by a time corresponding to one pixel;

means for delaying only the low-order bits by a time corresponding to one pixel;

means for delaying the parallel pixel data by a time corresponding to a horizontal line of the search area;

means, including plural parallel channels, for generating the parallel half-pixel data by interpolation between high-order bits and delayed low-order bits, by interpolation between high-order bits and delayed parallel pixel data; and by interpolation between low-order bits and parallel pixel data.

9. The apparatus of claim 8, wherein the interpolating means additionally includes selecting means, including plural parallel paths, for selecting, from the parallel half-pixel data, the sets of parallel half pixel data for serializing to provide each of the matching blocks.

10. The apparatus The apparatus of claim 8, wherein the interpolating means additionally includes means for generating additional half-pixel data by interpolation between the half-pixel data.

11. The apparatus of claim 1, wherein the interpolating means comprises:

means for dividing the parallel pixel data into high-order bits and low order bits;

pixel delay means for delaying only the low-order bits by a time corresponding to one pixel, means for performing first horizontal interpolation by summing the high-order bits and the low-order bits of each of the parallel pixel data to provide first half-pixel data;

means for performing second horizontal interpolation by adding the low order bits of each of the parallel pixel data from the pixel delay means to the high order bits of each of the parallel pixel data to provide second half-pixel data.

12. The apparatus of claim 11, wherein the interpolating means additionally comprises:

first selecting means for selecting, from the first half-pixel data, high-order bits of parallel half-pixel data of one of the matching blocks shifted, relative to the designated block, in a first horizontal direction;

second selecting means for selecting, from the first half-pixel data, high-order bits of parallel half-pixel data of one of the matching blocks shifted, relative to the designated block, in a second horizontal direction, opposite the first horizontal direction;

third selecting means for selecting, from the second half-pixel data, low-order bits of parallel half-pixel data of the one of the matching blocks shifted, relative to the designated block, in the first horizontal direction; and fourth selecting means for selecting, from the second half-pixel data, low-order bits of parallel half-pixel data of the one of the matching blocks shifted, relative to the designated block, in the second horizontal direction.

13. The apparatus of claim 12, wherein the interpolating means additionally comprises means for serializing the high-order bits and the low-order bits of the parallel half-pixel data to provide the half-pixel data of one of the plural matching blocks.

14. The apparatus of claim 11, wherein the means for performing first horizontal interpolation and the means for performing second horizontal interpolation are in independent parallel channels.

15. The apparatus of claim 11, wherein the interpolating means additionally comprises:

first line delay means for delaying the first half-pixel data by a time corresponding to a horizontal line of the search area;

second line delay means for delaying the second half-pixel data by a time corresponding to a horizontal line of the search area;

means for performing first horizontal and vertical interpolation by adding each of the delayed first half-pixel data from the first line delay means to each of the first half-pixel data to provide third half-pixel data; and means for performing second horizontal and vertical interpolation by adding each of the delayed second half-pixel data from the second line delay means to each of the second half-pixel data to provide fourth half-pixel data.

16. The apparatus of claim 15, wherein the interpolating means additionally comprises:

fifth selecting means for selecting, from the third half-pixel dam, high-order bits of parallel half-pixel data of one of the plural matching blocks shifted, relative to the designated block, in the first horizontal direction, and in a first vertical direction;

sixth selecting means for selecting, from the third half-pixel data, high-order bits of parallel half-pixel data of one of the plural matching blocks shifted, relative to the designated block, in the second horizontal direction, and in the first vertical direction;

seventh selecting means for selecting, from the fourth half-pixel data, low-order bits of parallel half-pixel data of the one of the plural matching blocks shifted, relative to the designated block, in the first horizontal direction and in the first vertical direction; and eighth selecting means for selecting, from the fourth half-pixel data, low-order bits of parallel half-pixel data of the one of the plural matching blocks shifted, relative to the designated block, in the second horizontal direction and in the first vertical direction.

17. The apparatus of claim 16, wherein the interpolating means additionally comprises means for serializing the high-order bits and the low-order bits of the parallel half-pixel data to provide the half-pixel data of one of the plural matching blocks.

18. The apparatus of claim 15, wherein the means for performing first horizontal and vertical interpolation and the means for performing second horizontal and vertical interpolation are in independent parallel channels.

19. The apparatus of claim 15, wherein the interpolating means additionally comprises:

third line delay means for further delaying the first half-pixel data from the first line delay means by a time corresponding to a horizontal line of the search area;

fourth line delay means for further delaying the second half-pixel from the second line delay means by a time corresponding to a horizontal line of the search area;

means for performing third horizontal and vertical interpolation by adding each of the first half-pixel data from the third line delay means to each of the first half-pixel data from the first line delay means to provide fifth half-pixel data; and means for performing fourth horizontal and vertical interpolation by adding each of the second half-pixel data from the fourth line delay means to each of the second half-pixel data from the second delay line means to provide sixth half-pixel data.

20. The apparatus of claim 19, wherein the interpolating means additionally comprises:

ninth selecting means for selecting, from the fifth half-pixel data, high-order bits of parallel half-pixel data of one of the plural matching blocks shifted, relative to the designated block, in the first horizontal direction, and in a second vertical direction, opposite the first vertical direction;

tenth selecting means for selecting, from the fifth half-pixel data, high-order bits of parallel half-pixel data of one of the plural matching blocks shifted, relative to the designated block, in the second horizontal direction, and in the second vertical direction;

eleventh selecting means for selecting, from the sixth half-pixel data, low-order bits of parallel half-pixel data of the one of the plural matching blocks shifted, relative to the designated block, in the first horizontal direction and in the second vertical direction; and twelfth selecting means for selecting, from the sixth half-pixel data, low-order bits of parallel half-pixel data of the one of the plural matching blocks shifted, relative to the designated block, in the second horizontal direction and in the second vertical direction.

21. The apparatus of claim 20, wherein the interpolating means additionally comprises means for serializing the high-order bits and the low-order bits of the parallel half-pixel data to provide the half-pixel data of one of the plural matching blocks.

22. The apparatus of claim 19, wherein the means for performing first horizontal and vertical interpolation and the means for performing second horizontal and vertical interpolation are in independent parallel channels.

23. The apparatus of claim 1, wherein the interpolating means additionally comprises:

fifth line delay means for delaying the parallel pixel data by a time corresponding to a horizontal line of search area;

means for performing first vertical interpolation by summing the high-order bits of each of the parallel pixel data from the fifth line delay means and the high-order bits of each of the parallel pixel data to provide seventh half-pixel data;

means for performing second vertical interpolation by adding the low-order bits of each of the parallel pixel data from the fifth line delay means to the low-order bits of each of the parallel pixel data to provide eighth half-pixel data.

24. The apparatus of claim 23, wherein the interpolating means additionally comprises:

thirteenth selecting means for selecting, from the seventh half-pixel data, high-order bits of parallel half-pixel data of one of the plural matching blocks shifted, relative to the designated block, in a first vertical direction;

fourteenth selecting means for selecting, from the eighth half-pixel data, low-order bits of parallel half-pixel data of the one of the plural matching blocks shifted, relative to the designated block, in the first vertical direction.

25. The apparatus of claim 24, wherein the interpolating means additionally comprises means for serializing the high-order bits and the low-order bits of the parallel half-pixel data to provide the half-pixel data of one of the plural matching blocks.

26. The apparatus of claim 23, wherein the means for performing first vertical interpolation and the means for performing second vertical interpolation are in parallel independent channels.

27. The apparatus of claim 23, wherein the interpolating means additionally comprises:

sixth line delay means for delaying the parallel pixel data from the fifth line delay means by a time corresponding to a horizontal line of the search area;

means for performing third vertical interpolation by summing the high-order bits of each of the parallel pixel data from the sixth line delay means and the high-order bits of each of the parallel pixel data from the fifth line delay means to provide ninth half-pixel data;

means for performing fourth vertical interpolation by adding the low-order bits of each of the parallel pixel data from the sixth line delay means to the low-order bits of each of the parallel pixel data from the fifth line delay means to provide tenth half-pixel data;

means for performing fourth vertical interpolation by adding the low-order bits of each of the parallel pixel data from the sixth delay means to the low-order bits of each of the parallel pixel data from the fifth line delay means to provide tenth half-pixel data.

28. The apparatus of claim 27, wherein the interpolating means additionally comprises:

fifteenth selecting means for selecting, from the ninth half-pixel data, high-order bits of parallel half-pixel data of one of the plural matching blocks shifted, relative to the designated block, in a second vertical direction, opposite the first vertical direction;

sixteenth selecting means for selecting, from the tenth half-pixel data, low-order bits of parallel half-pixel data of the one of the plural matching blocks shifted, relative to the designated block, in the second vertical direction.

29. The apparatus of claim 28, wherein the interpolating means additionally comprises means for serializing the high-order bits and the low-order bits of the parallel half-pixel data to provide the half-pixel data of one of the plural matching blocks.

30. The apparatus of claim 27, wherein the means for performing third vertical interpolation and the means for performing fourth vertical interpolation are in parallel independent channels.

31. The apparatus of claim 1, wherein the interpolating means additionally comprises:

means for selecting, from the parallel pixel data of the search area received by the interpolating means from the search area selecting means, the parallel pixel data of the designated block; and means for serializing the parallel pixel data of the designated block to provide an additional matching block on an additional exclusive parallel path.

32. The apparatus of claim 31, wherein the means for identifying one of the plural matching blocks includes:

parallel means for deriving a block of differences between the picture block and each matching block in the set of matching blocks;

parallel means for generating an difference absolute value sum for the block of differences derived for each matching block in the set of matching blocks; and means for generating a selection signal identifying the block of differences having a least difference absolute value sum.

33. The apparatus of claim 32, wherein the means for identifying additionally comprises first selecting means, responsive to the selection signal, for selecting the matching block corresponding to the block of differences having the least absolute value sum as a reference block.

34. The apparatus of claim 32, wherein the means for identifying additionally comprises second selecting means, responsive to the selection signal, for selecting the block of differences having the least difference absolute value sum as a difference block.

35. The apparatus of claim 34, wherein the apparatus is additionally for compressing the digital motion picture signal, and additionally comprises:

means for orthogonally transforming the difference block to provide transform coefficients; and means for quantizing the transform coefficients.

36. The apparatus of claim 31, wherein the motion vector calculating means includes:

means for determining a secondary motion vector from the selection signal; and means for synthesizing the secondary motion vector with the primary motion vector to provide the motion vector with half-pixel precision.

* * * * *